US009898897B2

(12) United States Patent
Lark

(10) Patent No.: US 9,898,897 B2
(45) Date of Patent: *Feb. 20, 2018

(54) GAMING SYSTEM AND METHOD PROVIDING AN ENHANCED WINNING HAND DISPLAY FEATURE

(71) Applicant: IGT, Las Vegas, NV (US)

(72) Inventor: David R. Lark, Reno, NV (US)

(73) Assignee: IGT, Las Vegas, NV (US)

( * ) Notice: Subject to any disclaimer, the term of this patent is extended or adjusted under 35 U.S.C. 154(b) by 32 days.

This patent is subject to a terminal disclaimer.

(21) Appl. No.: 15/160,788

(22) Filed: May 20, 2016

(65) Prior Publication Data
US 2016/0267749 A1 Sep. 15, 2016

Related U.S. Application Data

(63) Continuation of application No. 13/724,156, filed on Dec. 21, 2012, now Pat. No. 9,345,960.

(51) Int. Cl.
A63F 9/24 (2006.01)
A63F 13/00 (2014.01)
G06F 17/00 (2006.01)
G06F 19/00 (2011.01)
G07F 17/32 (2006.01)

(52) U.S. Cl.
CPC ........ G07F 17/3293 (2013.01); A63F 13/005 (2013.01); G07F 17/326 (2013.01); G07F 17/3211 (2013.01); G07F 17/3244 (2013.01)

(58) Field of Classification Search
CPC ............... G07F 17/326; G07F 17/3211; G07F 17/3293; G07F 17/3244; A63F 13/005
USPC .............................................. 463/12, 13, 31
See application file for complete search history.

(56) References Cited

U.S. PATENT DOCUMENTS

| 5,100,137 A | 3/1992 | Fulton et al. |
| 5,167,413 A | 12/1992 | Fulton et al. |
| 5,251,897 A | 10/1993 | Fulton et al. |
| 5,322,295 A | 6/1994 | Cabot et al. |
| 5,374,067 A | 12/1994 | Jones et al. |
| 5,377,973 A | 1/1995 | Jones et al. |
| 5,380,012 A | 1/1995 | Jones et al. |
| 5,382,025 A | 1/1995 | Sklansky et al. |

(Continued)

Primary Examiner — Omkar Deodhar
Assistant Examiner — Wei Lee
(74) Attorney, Agent, or Firm — Neal, Gerber & Eisenberg LLP

(57) ABSTRACT

The present disclosure provides various embodiments directed to a gaming system and method providing an enhanced winning hand display feature. In one embodiment, the gaming system displays a plurality of initial hands of cards, receives a hand formation input, and forms and displays a complete hand for each initial hand. For each complete hand, the gaming system determines whether that complete hand forms a winning hand associated with one of a plurality of different winning hand categories. If at least one complete hand forms a winning hand associated with one of the winning hand categories, for each complete hand that forms one such winning hand, the gaming system displays the winning hand category associated with that winning hand, receives a selection of a displayed winning hand category, and adds an enhancement to the display of any complete hand that forms a winning hand associated with the selected winning hand category.

20 Claims, 16 Drawing Sheets

(56) References Cited

U.S. PATENT DOCUMENTS

| | | |
|---|---|---|
| 5,411,257 A | 5/1995 | Fulton et al. |
| 5,431,408 A | 7/1995 | Adams et al. |
| 5,437,451 A | 8/1995 | Fulton et al. |
| 5,531,448 A | 7/1996 | Moody et al. |
| 5,580,053 A | 12/1996 | Crouch |
| 5,636,842 A | 6/1997 | Cabot et al. |
| 5,732,950 A | 3/1998 | Moody et al. |
| 5,755,621 A | 5/1998 | Marks et al. |
| 5,766,074 A | 6/1998 | Cannon et al. |
| 5,803,809 A | 9/1998 | Yoseloff |
| 5,820,460 A | 10/1998 | Fulton et al. |
| 5,823,873 A | 10/1998 | Moody et al. |
| 5,833,536 A | 11/1998 | Davids et al. |
| 5,833,537 A | 11/1998 | Barrie |
| 5,882,259 A | 3/1999 | Holmes et al. |
| 5,902,184 A | 5/1999 | Bennett et al. |
| 5,911,418 A | 6/1999 | Adams et al. |
| 5,954,335 A | 9/1999 | Moody et al. |
| 5,957,774 A | 9/1999 | Holmes et al. |
| 5,976,016 A | 11/1999 | Moody et al. |
| 6,004,208 A | 12/1999 | Takemoto et al. |
| 6,007,066 A | 12/1999 | Moody et al. |
| 6,050,658 A | 4/2000 | O'Sullivan et al. |
| 6,062,979 A | 5/2000 | Inoue |
| 6,098,985 A | 8/2000 | Moody et al. |
| 6,120,378 A | 9/2000 | Moody et al. |
| 6,135,883 A | 10/2000 | Hachquet |
| 6,135,884 A | 10/2000 | Hedrick et al. |
| 6,176,781 B1 | 1/2001 | Walker et al. |
| 6,193,235 B1 | 2/2001 | Vancura et al. |
| 6,196,547 B1 | 3/2001 | Pascal et al. |
| 6,248,016 B1 | 6/2001 | Walker et al. |
| 6,257,979 B1 | 7/2001 | Walker et al. |
| 6,261,178 B1 | 7/2001 | Bennett |
| 6,300,956 B1 | 10/2001 | Apodaca et al. |
| 6,302,790 B1 | 10/2001 | Brossard |
| 6,311,978 B1 | 11/2001 | Moody |
| 6,319,124 B1 | 11/2001 | Baerlocher et al. |
| 6,332,839 B2 | 12/2001 | Walker et al. |
| 6,334,613 B1 | 1/2002 | Yoseloff |
| 6,336,863 B1 | 1/2002 | Baerlocher et al. |
| 6,358,147 B1 | 3/2002 | Jaffe et al. |
| 6,406,023 B1 | 6/2002 | Rowe |
| 6,419,578 B1 | 7/2002 | Moody et al. |
| 6,422,940 B1 | 7/2002 | Walker et al. |
| 6,474,645 B2 | 11/2002 | Tarantino |
| 6,517,074 B1 | 2/2003 | Moody et al. |
| 6,523,829 B1 | 2/2003 | Walker et al. |
| 6,533,658 B1 | 3/2003 | Walker et al. |
| 6,558,254 B2 | 5/2003 | Baelocher et al. |
| 6,561,898 B2 | 5/2003 | Moody |
| 6,568,680 B1 | 5/2003 | Moody et al. |
| 6,569,014 B2 | 5/2003 | Walker et al. |
| 6,582,306 B1 | 6/2003 | Kaminkow |
| 6,604,999 B2 | 8/2003 | Ainsworth |
| 6,605,002 B2 | 8/2003 | Baerlocher |
| 6,652,377 B1 | 11/2003 | Moody |
| 6,672,959 B2 | 1/2004 | Moody et al. |
| 6,692,356 B2 | 2/2004 | Baerlocher et al. |
| 6,695,696 B1 | 2/2004 | Kaminkow |
| 6,729,961 B1 | 5/2004 | Millerschone |
| 6,739,973 B1 | 5/2004 | Lucchesi et al. |
| 6,811,485 B2 | 11/2004 | Kaminkow |
| 6,832,959 B2 | 12/2004 | Baerlocher |
| 6,869,357 B2 | 3/2005 | Adams |
| 6,890,254 B2 | 5/2005 | Kaminkow |
| 6,916,245 B1 | 7/2005 | Vancura et al. |
| 6,935,950 B2 | 8/2005 | Tarantino |
| 6,955,356 B2 | 10/2005 | Moody |
| 6,964,418 B2 | 11/2005 | Moody |
| 6,969,316 B2 | 11/2005 | Jarvis et al. |
| 6,991,538 B2 | 1/2006 | Cannon |
| 6,994,624 B2 | 2/2006 | Gold et al. |
| 7,040,982 B1 | 5/2006 | Jarvis et al. |
| 7,056,207 B2 | 6/2006 | Walker et al. |
| 7,059,965 B2 | 6/2006 | Jackson |
| 7,137,628 B2 | 11/2006 | Moody |
| 7,156,397 B2 | 1/2007 | Moody et al. |
| 7,156,734 B1 | 1/2007 | Walker et al. |
| 7,156,736 B2 | 1/2007 | Adams et al. |
| 7,201,654 B1* | 4/2007 | Jarvis ................ A63F 1/00 463/13 |
| 7,201,655 B2 | 4/2007 | Walker et al. |
| 7,222,857 B2 | 5/2007 | Moody |
| 7,222,858 B2 | 5/2007 | Moody |
| 7,247,092 B2 | 7/2007 | Jarvis |
| 7,258,613 B2 | 8/2007 | Lucchesi et al. |
| 7,297,057 B2 | 11/2007 | Gerrard et al. |
| 7,311,598 B2 | 12/2007 | Kaminkow et al. |
| 7,311,604 B2 | 12/2007 | Kaminkow et al. |
| 7,329,182 B2 | 2/2008 | Adams et al. |
| 7,338,360 B2 | 3/2008 | Jarvis et al. |
| 7,354,344 B2 | 4/2008 | Paulsen et al. |
| 7,361,088 B2 | 4/2008 | Maya et al. |
| 7,387,568 B2 | 6/2008 | Millerschone |
| 7,390,258 B2 | 6/2008 | Millerschone |
| 7,393,276 B2 | 7/2008 | Millerschone |
| 7,393,277 B2 | 7/2008 | Jackson |
| 7,404,762 B2 | 7/2008 | Moody |
| 7,413,508 B2 | 8/2008 | Nelson et al. |
| 7,416,186 B2 | 8/2008 | Walker et al. |
| 7,419,162 B2 | 9/2008 | Lancaster et al. |
| 7,427,236 B2 | 9/2008 | Kaminkow et al. |
| 7,431,644 B2 | 10/2008 | Moody |
| 7,431,646 B2 | 10/2008 | Jackson |
| 7,448,949 B2 | 11/2008 | Kaminkow et al. |
| 7,467,999 B2 | 12/2008 | Walker et al. |
| 7,476,542 B2 | 1/2009 | Walker et al. |
| 7,481,705 B2 | 1/2009 | Jarvis et al. |
| 7,481,710 B2 | 1/2009 | Kaminkow |
| 7,488,245 B2 | 2/2009 | Jarvis et al. |
| 7,488,251 B2 | 2/2009 | Kaminkow |
| 7,494,411 B2 | 2/2009 | Baerlocher |
| 7,494,413 B2 | 2/2009 | Singer et al. |
| 7,524,243 B2 | 4/2009 | Bansemer et al. |
| 7,594,849 B2 | 9/2009 | Cannon |
| 7,601,061 B2 | 10/2009 | Jackson |
| 7,601,062 B2 | 10/2009 | Cole et al. |
| 7,614,946 B2 | 11/2009 | Nicely |
| 7,625,280 B2 | 12/2009 | Singer et al. |
| 7,641,197 B2 | 1/2010 | Jackson |
| 7,658,672 B1 | 2/2010 | Wolf et al. |
| 7,666,092 B2 | 2/2010 | Kaminkow et al. |
| 7,748,714 B2 | 7/2010 | Nicely et al. |
| 7,749,059 B2 | 7/2010 | Tarantino |
| 7,749,061 B2 | 7/2010 | Walker et al. |
| 7,771,270 B2 | 8/2010 | Kaminkow et al. |
| 7,771,274 B2 | 8/2010 | Walker et al. |
| 7,785,188 B2 | 8/2010 | Cannon |
| 7,803,041 B2 | 9/2010 | Gold et al. |
| 7,803,043 B2 | 9/2010 | Jackson |
| 7,815,500 B2 | 10/2010 | Montross et al. |
| 7,837,545 B2 | 11/2010 | Blair, Jr. et al. |
| 7,857,693 B1 | 12/2010 | Johnson et al. |
| 7,862,417 B2 | 1/2011 | Nicely |
| 7,867,073 B2 | 1/2011 | Walker et al. |
| 7,896,734 B2 | 3/2011 | Kaminkow et al. |
| 7,914,369 B2 | 3/2011 | Walker et al. |
| 7,918,724 B2 | 4/2011 | Walker et al. |
| 7,922,571 B2 | 4/2011 | Walker et al. |
| 7,993,191 B2 | 8/2011 | Evans et al. |
| 8,016,674 B2 | 9/2011 | Lucchesi et al. |
| 2003/0130024 A1 | 7/2003 | Darby |
| 2004/0192431 A1 | 9/2004 | Singer et al. |
| 2004/0195773 A1 | 10/2004 | Masci et al. |
| 2005/0187011 A1 | 8/2005 | Kaminkow |
| 2005/0202863 A1 | 9/2005 | Macaulay |
| 2005/0208994 A1 | 9/2005 | Berman |
| 2006/0030403 A1 | 2/2006 | Lafky |
| 2006/0068905 A1 | 3/2006 | Umezaki |
| 2006/0084497 A1 | 4/2006 | Marks et al. |
| 2006/0121969 A1 | 6/2006 | Marks et al. |
| 2006/0135238 A1 | 6/2006 | Lancaster et al. |
| 2006/0183535 A1 | 8/2006 | Marks et al. |

(56) References Cited

U.S. PATENT DOCUMENTS

| | | | |
|---|---|---|---|
| 2006/0194628 A1* | 8/2006 | Novellie | A63F 1/00 463/13 |
| 2006/0205501 A1 | 9/2006 | Jarvis et al. | |
| 2007/0026923 A1 | 2/2007 | Muir | |
| 2007/0054721 A1 | 3/2007 | Jackson | |
| 2007/0135193 A1 | 6/2007 | Nicely | |
| 2007/0135194 A1 | 6/2007 | Nicely et al. | |
| 2007/0232383 A1* | 10/2007 | Berman | G07F 17/34 463/20 |
| 2008/0020815 A1 | 1/2008 | Lancaster et al. | |
| 2008/0064462 A1 | 3/2008 | Gerrard et al. | |
| 2008/0070669 A1 | 3/2008 | Walker et al. | |
| 2008/0070674 A1 | 3/2008 | Lancaster et al. | |
| 2008/0070702 A1 | 3/2008 | Kaminkow et al. | |
| 2008/0076500 A1 | 3/2008 | Lancaster et al. | |
| 2008/0108409 A1 | 5/2008 | Cole et al. | |
| 2008/0111308 A1 | 5/2008 | Snow | |
| 2008/0113701 A1 | 5/2008 | Schultz et al. | |
| 2008/0113704 A1 | 5/2008 | Jackson | |
| 2008/0119257 A1 | 5/2008 | Stern et al. | |
| 2008/0146304 A1 | 6/2008 | Jarvis et al. | |
| 2008/0146311 A1 | 6/2008 | Walker et al. | |
| 2008/0161096 A1 | 7/2008 | Jackson | |
| 2008/0188278 A1 | 8/2008 | Paulsen et al. | |
| 2008/0214255 A1 | 9/2008 | Jarvis et al. | |
| 2008/0254847 A1 | 10/2008 | Millerschone | |
| 2008/0274789 A1 | 11/2008 | Singer et al. | |
| 2009/0005144 A1 | 1/2009 | Moody | |
| 2009/0042637 A1 | 2/2009 | Singer et al. | |
| 2009/0104962 A1 | 4/2009 | Nicely et al. | |
| 2009/0117959 A1 | 5/2009 | Nicely | |
| 2009/0121434 A1 | 5/2009 | Baerlocher et al. | |
| 2009/0124313 A1 | 5/2009 | Nicely | |
| 2009/0124316 A1 | 5/2009 | Baerlocher et al. | |
| 2009/0124326 A1 | 5/2009 | Caputo et al. | |
| 2009/0124334 A1 | 5/2009 | Jones et al. | |
| 2009/0181743 A1 | 7/2009 | Bansemer et al. | |
| 2009/0286591 A1 | 11/2009 | Singer et al. | |
| 2009/0305765 A1 | 12/2009 | Walker et al. | |
| 2010/0004051 A1 | 1/2010 | Walker et al. | |
| 2010/0035676 A1 | 2/2010 | Nicely et al. | |
| 2010/0099480 A1 | 4/2010 | Caputo | |
| 2010/0120484 A1 | 5/2010 | Caputo et al. | |
| 2010/0120514 A1 | 5/2010 | Caputo | |
| 2010/0144415 A1 | 6/2010 | Wolf et al. | |
| 2010/0227661 A1 | 9/2010 | Walker et al. | |
| 2010/0252997 A1 | 10/2010 | Walker et al. | |
| 2010/0289220 A1 | 11/2010 | Jackson | |
| 2010/0325568 A1* | 12/2010 | Pedersen | G06F 17/30994 715/765 |
| 2010/0331068 A1 | 12/2010 | Walker et al. | |
| 2011/0003625 A1 | 1/2011 | Montross et al. | |
| 2011/0014963 A1 | 1/2011 | Walker et al. | |
| 2011/0111818 A1 | 5/2011 | Baerlocher | |

* cited by examiner

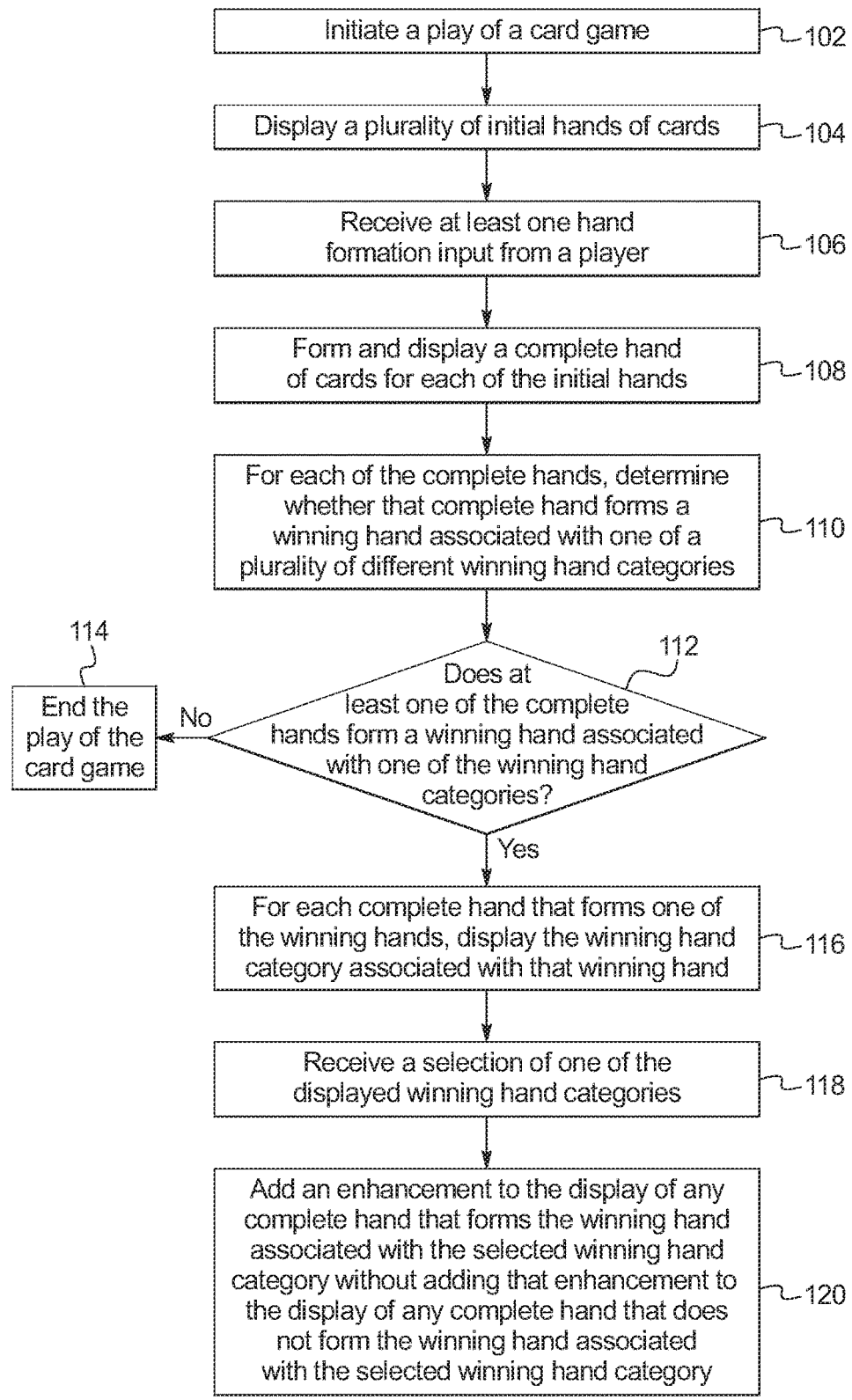

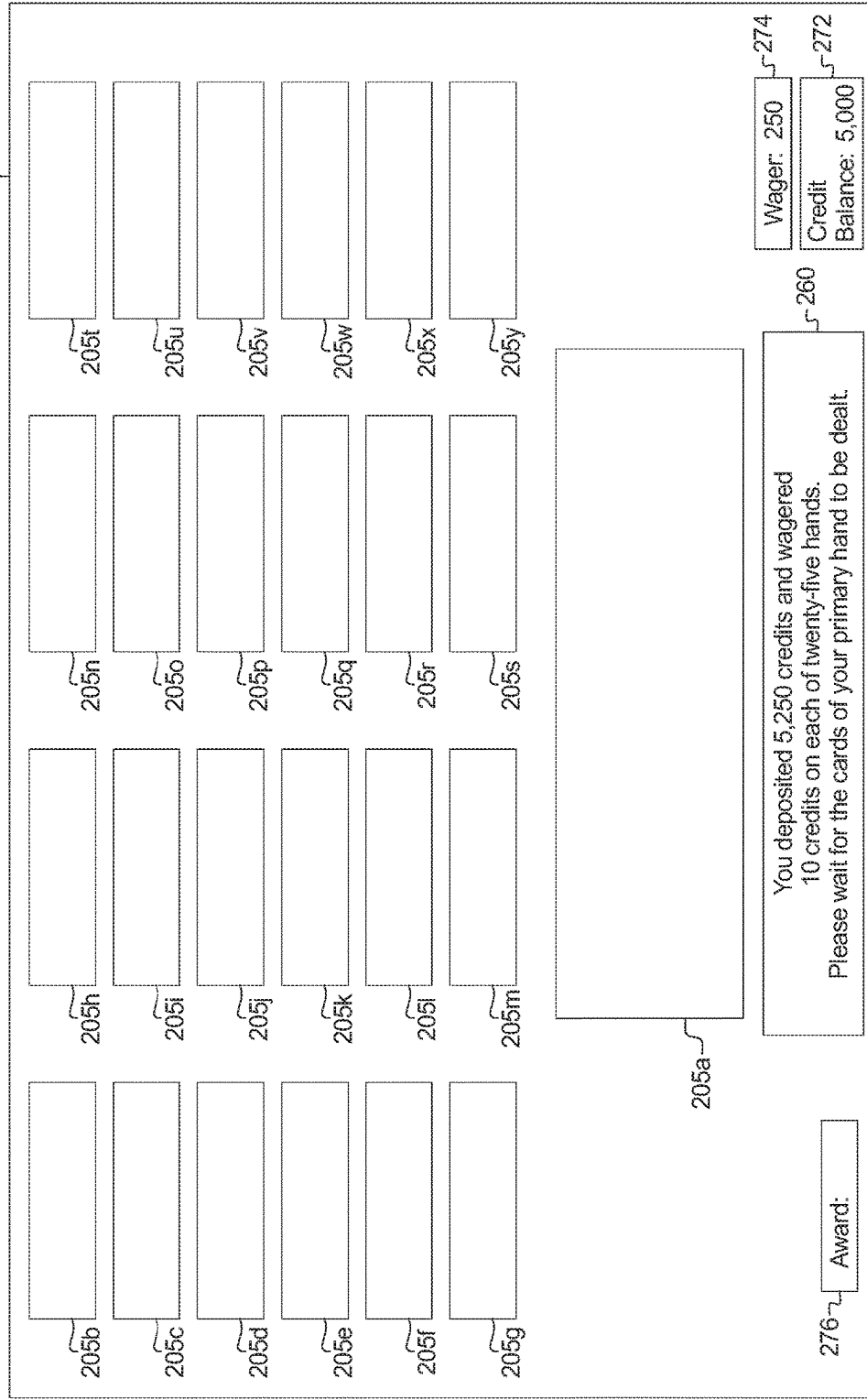

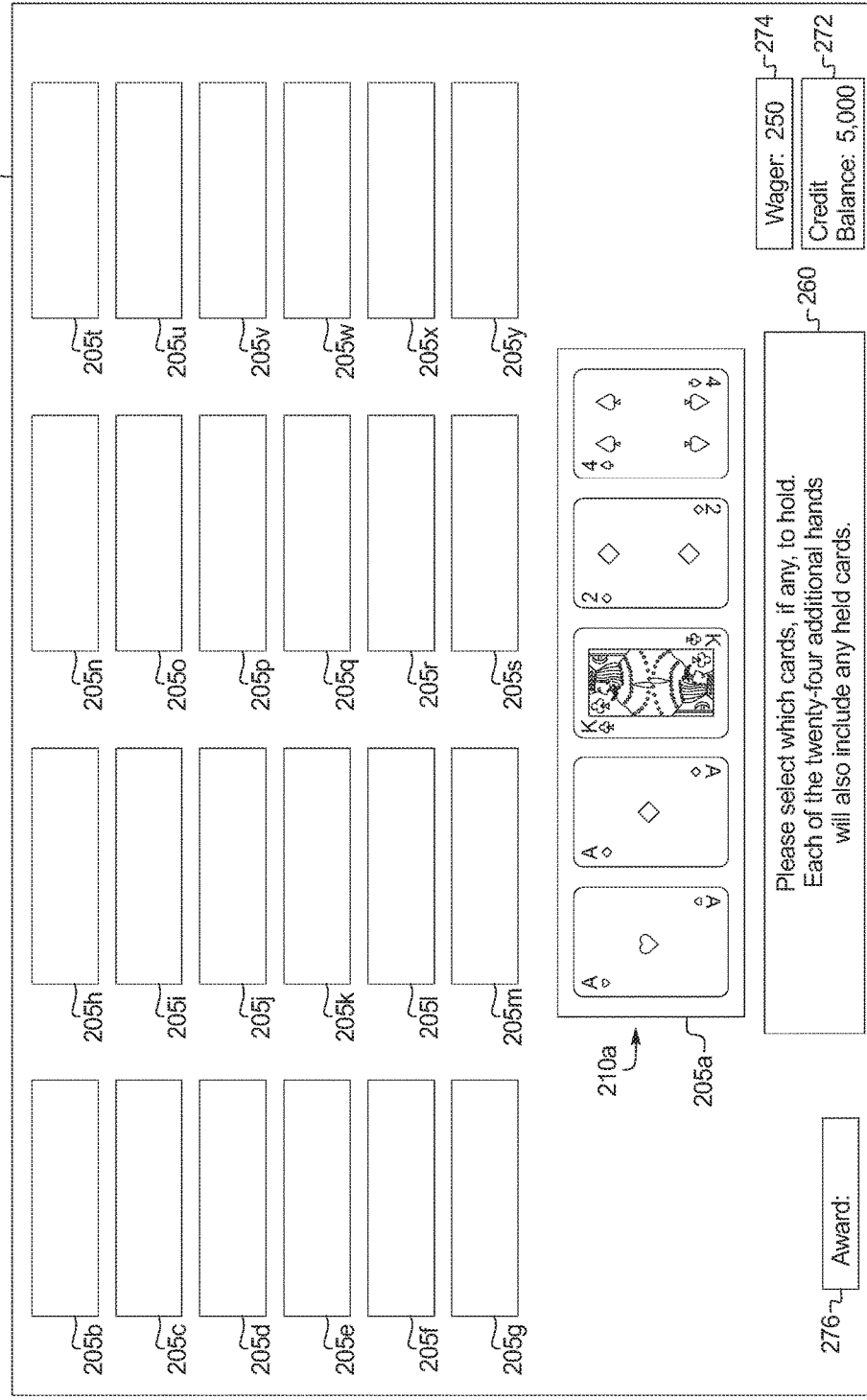

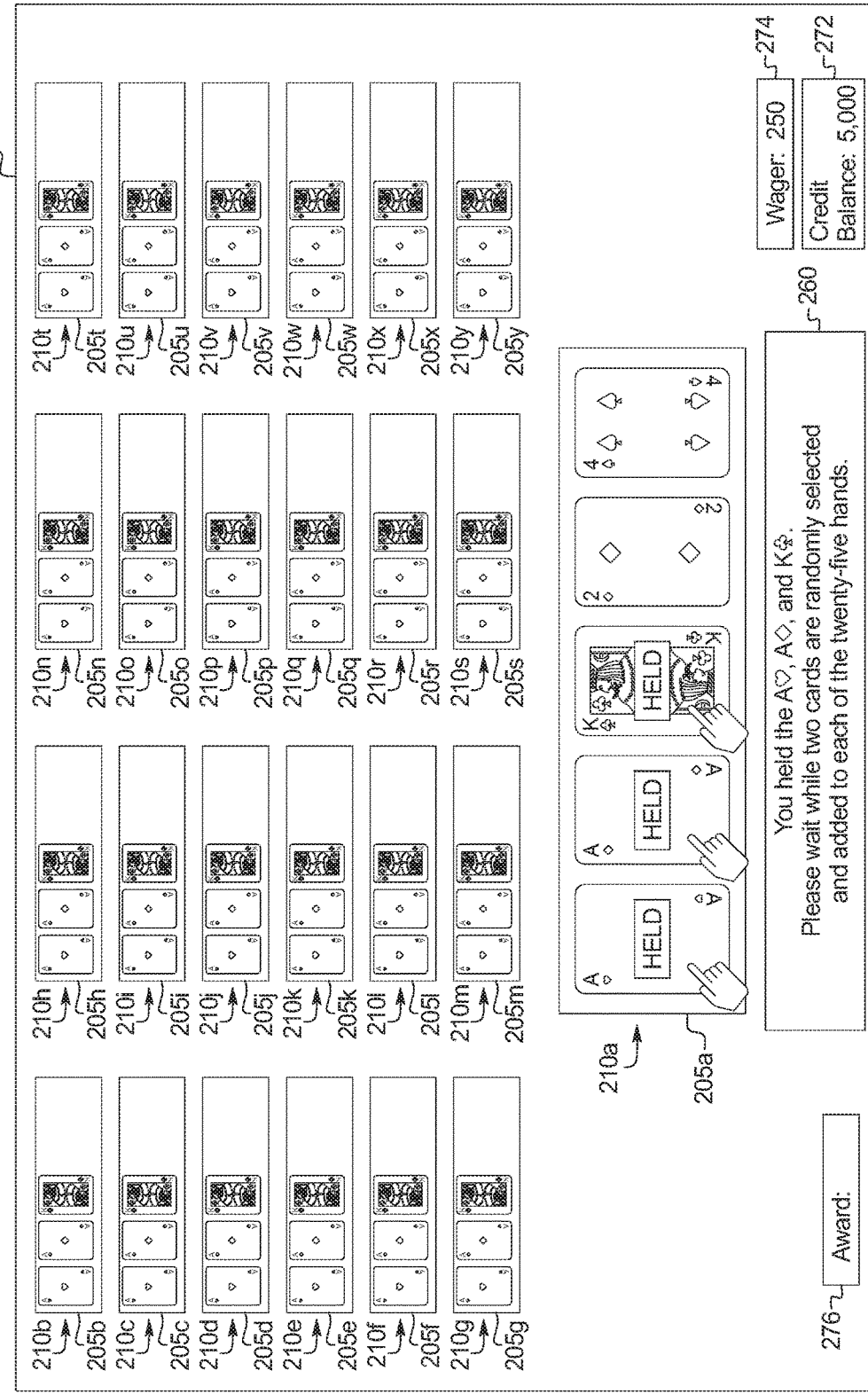

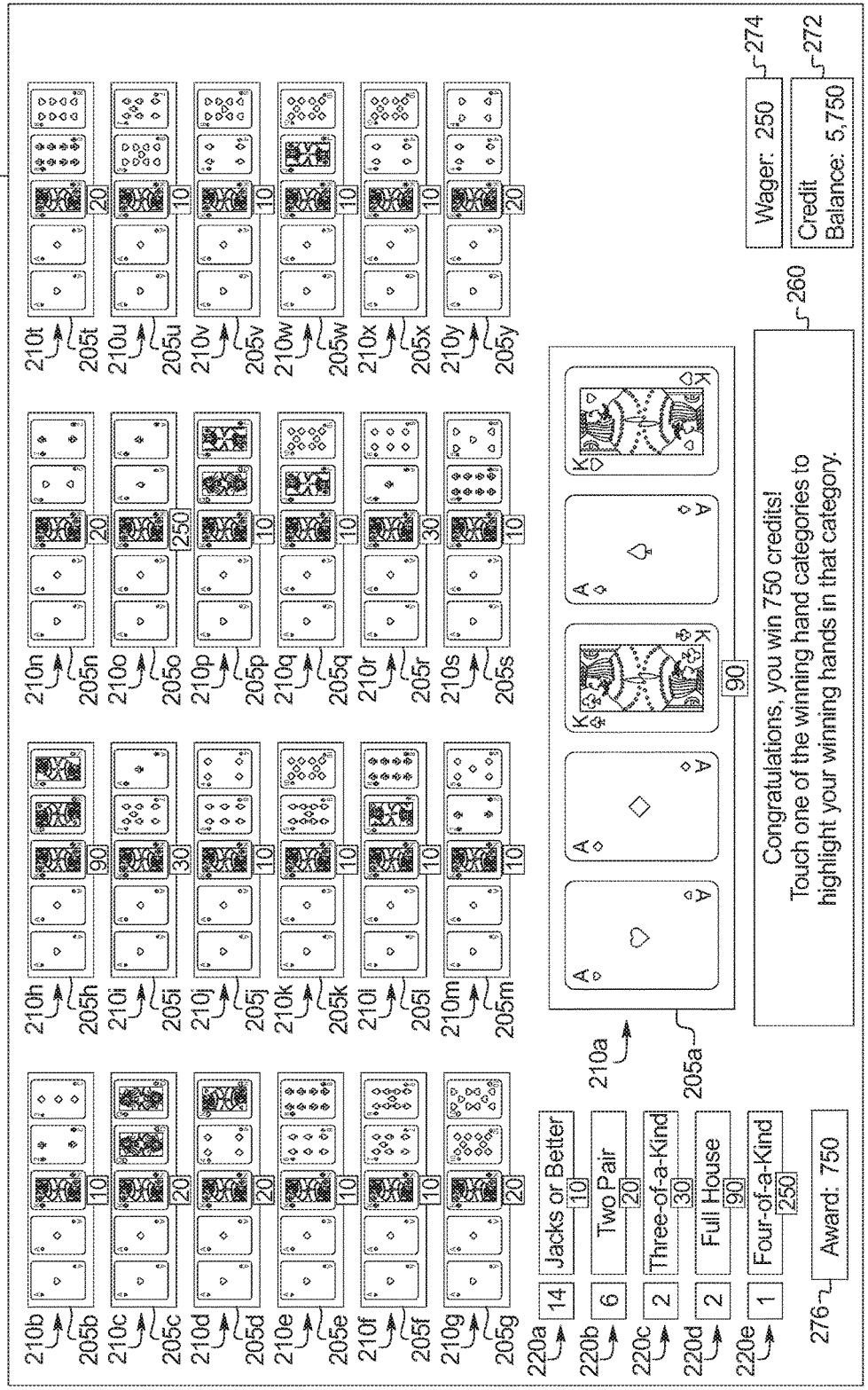

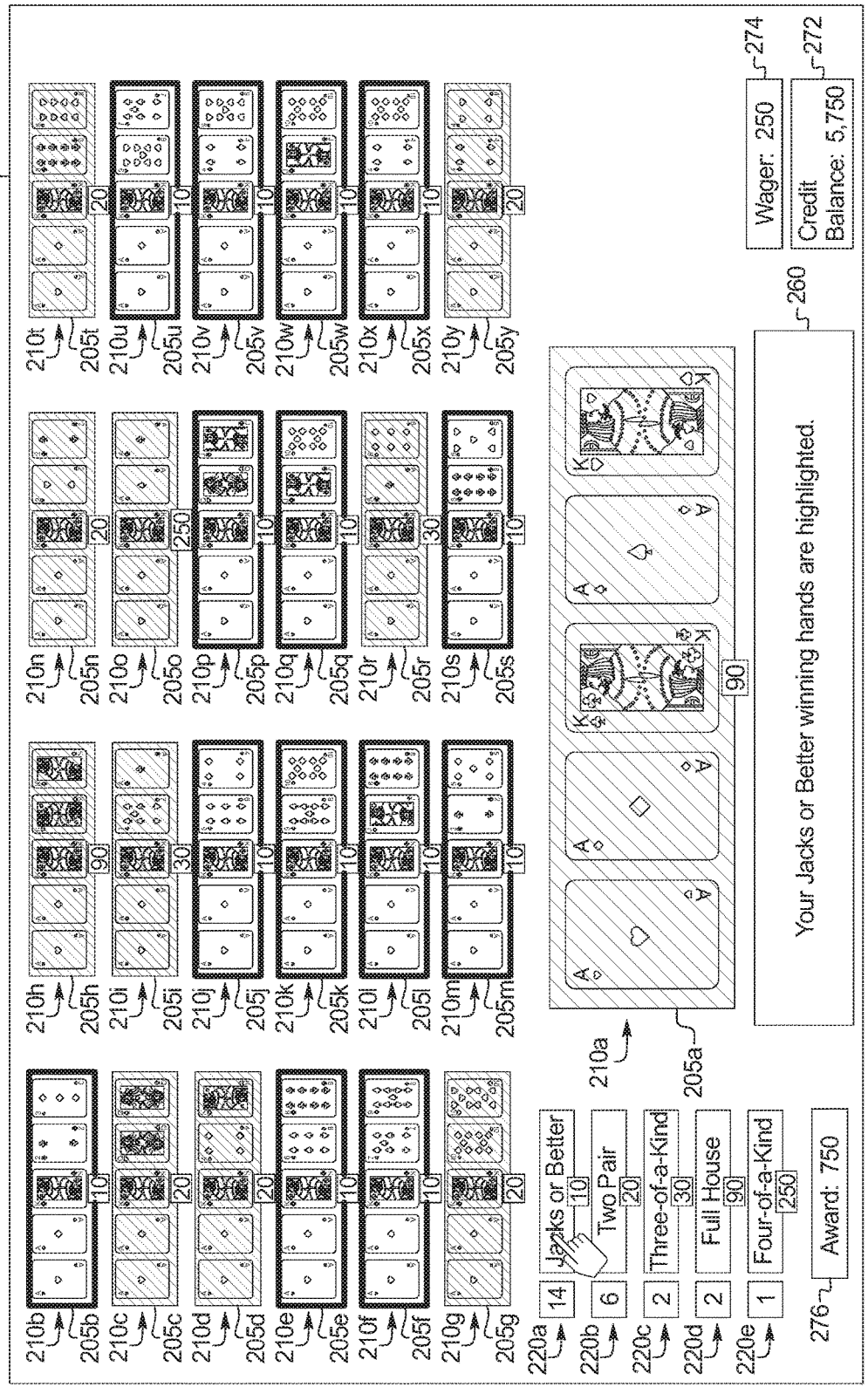

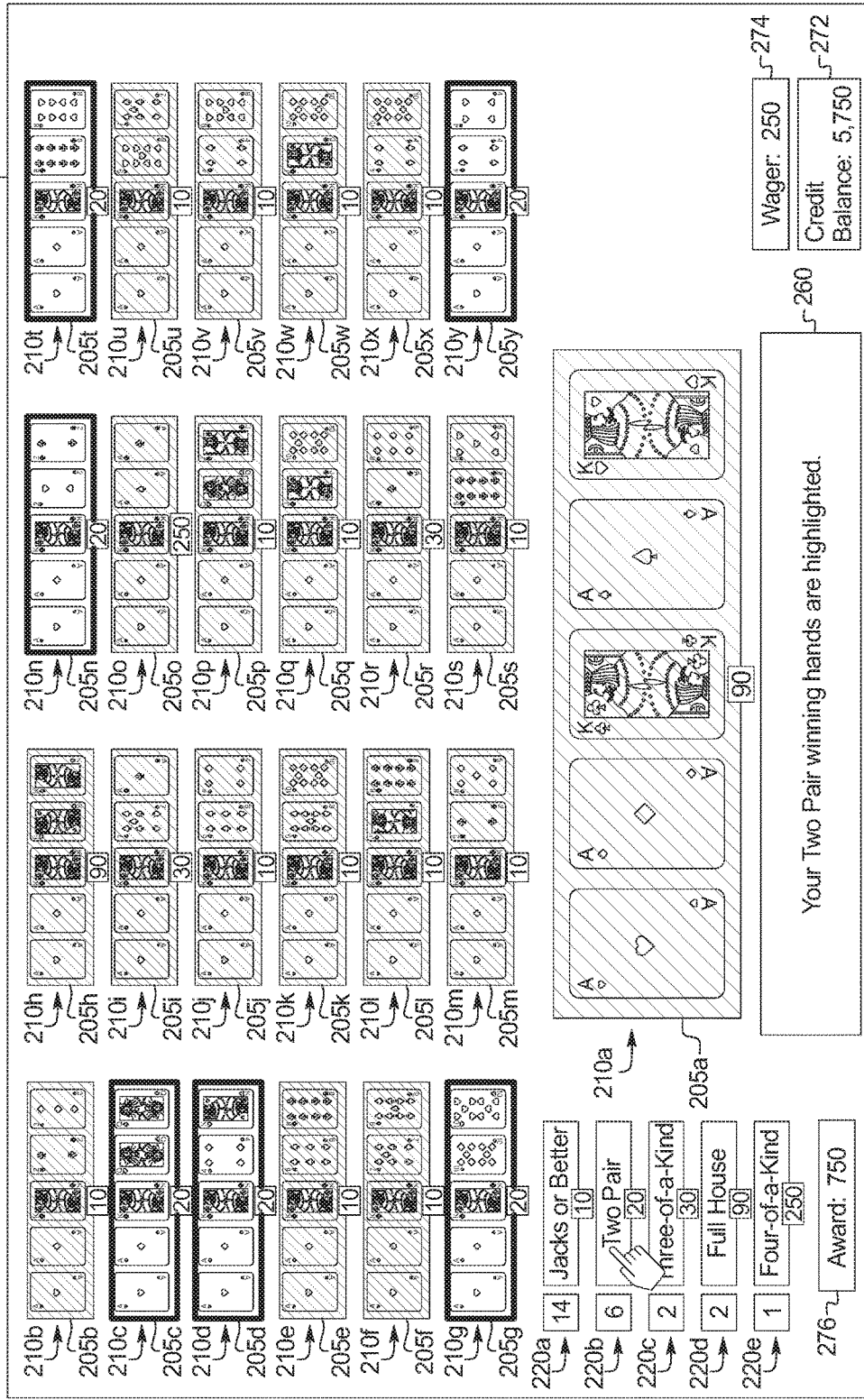

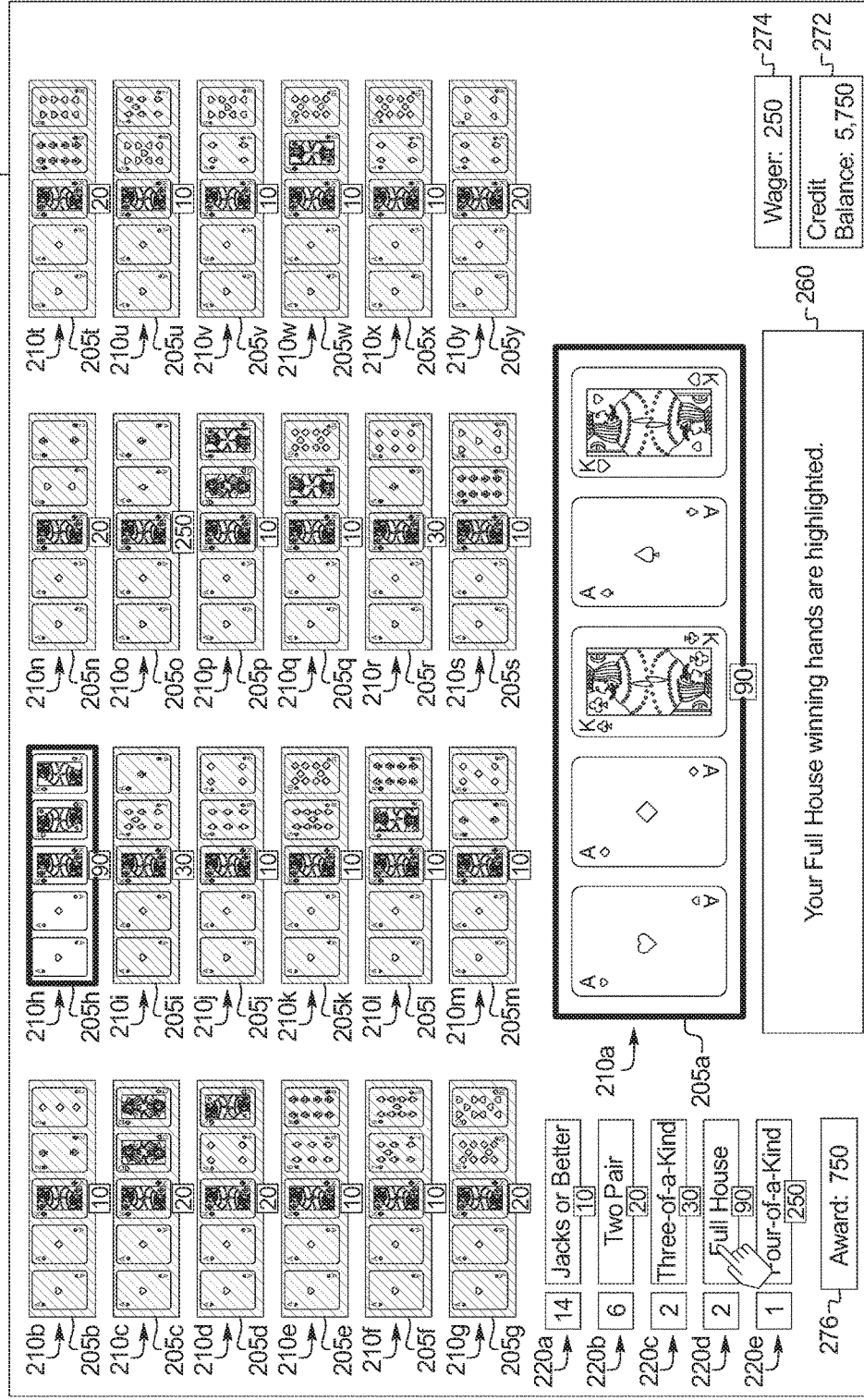

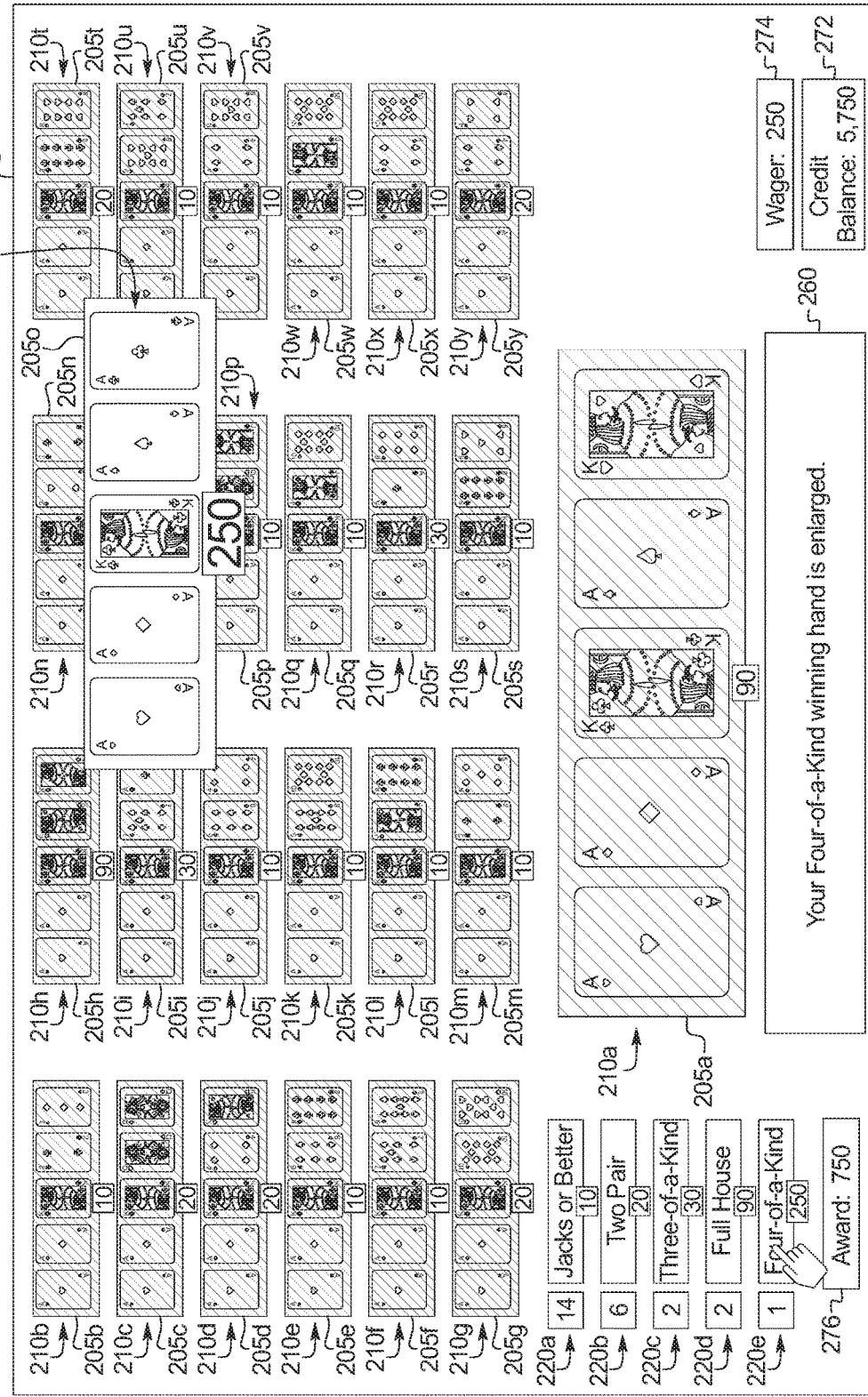

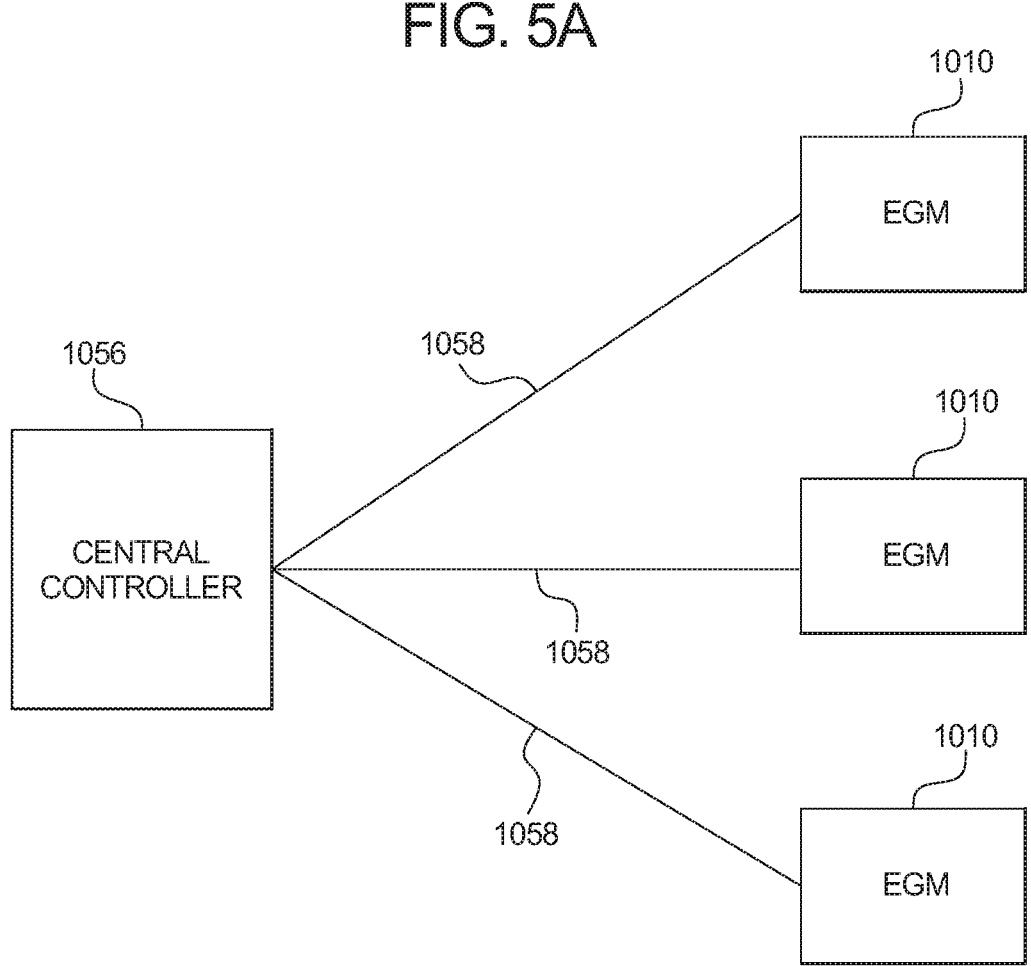

GAMING SYSTEM AND METHOD
PROVIDING AN ENHANCED WINNING
HAND DISPLAY FEATURE

PRIORITY CLAIM

This application is a continuation of, and claims priority to and the benefit of, U.S. patent application Ser. No. 13/724,156, which was filed on Dec. 21, 2012, the entire contents of which are incorporated herein by reference.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Over the past three decades, video poker has become very popular. One of the most common variations of video poker is Five Card Draw Poker. In general, for a play of a Five Card Draw Poker game, a gaming system deals a player a hand of five cards face up from a fifty-two card deck of playing cards. The gaming system enables the player to discard none of, one of, a plurality of but less than all of, or all of the five cards from the player's hand. The gaming system replaces each discarded card with another card from the deck. After replacement of any discarded cards, the gaming system evaluates the cards of the player's hand against a paytable to determine whether the player's hand forms a winning hand associated with one of a plurality of different winning hand categories.

The paytable employed by the gaming system is determined based on the type of Five Card Draw Game being played. Table 1 below includes the different winning hand categories, example winning hands associated with the different winning hand categories, and awards associated with the different winning hand categories for different wager amounts for an example Jacks or Better Five Card Draw Poker Game. These winning hand categories are listed from highest to lowest ranking. In this example, the winning hands of the "Jacks or Better" winning hand category include a pair of Jacks, a pair of Queens, a pair of Kings, and a pair of Aces.

Multi-play video poker games such as Triple Play Video Poker, Five Play Video Poker, Ten Play Video Poker, Fifty Play Video Poker, and One Hundred Play Video Poker have also become very popular. Such multi-play poker games employ a primary hand and one or more additional hands that are played simultaneously. In many of these multi-play poker games, the gaming system deals a primary hand of five cards from a deck of cards to the player and enables the player to discard none of, one of, a plurality of but less than all of, or all of the five cards from the primary hand. The gaming system includes any cards held in the primary hand (i.e., any non-discarded cards in the primary hand) in each additional hand. The gaming system then completes the primary hand by adding one or more replacement cards (if necessary) from the deck, and completes each additional hand by adding one or more additional cards from a separate deck.

FIG. 1 illustrates a screen shot of a gaming system operating One Hundred Play Video Poker, which includes one primary hand and ninety-nine additional hands. For a play of One Hundred Play Video Poker, the displayed additional hands are relatively small (compared to the displayed primary hand) and, for all intents and purposes, unreadable or extremely difficult to read. As a result, certain players of One Hundred Play Video Poker are often frustrated because these players are not able to determine which of the additional hands are winning hands. Indeed, such players may not even be able to determine which cards are included in the additional hands, much less whether those cards form winning hands.

In certain known multi-play poker games the gaming system attempts to solve this problem by, after determining whether any of the hands are winning hands, displaying a summary of the winning hands that includes a quantity of the winning hands associated with each winning hand category. However, due to the large quantity of hands and the relatively small displays of the hands, it is still difficult for a player to discern exactly which of the hands are winning hands.

A continuing need thus exists for gaming systems and methods that provide new and exciting card games that facilitate game play and increase player enjoyment.

SUMMARY

Various embodiments of the present disclosure are directed to a gaming system and method providing an enhanced winning hand display feature. In certain embodi-

TABLE 1

Winning Hand Categories, Example Winning Hands, and Awards for
Example Jacks or Better Five Card Draw Poker

| Winning Hand Category | Example Winning Hand | Award (Wager of 1 Credit) | Award (Wager of 2 Credits) | Award (Wager of 3 Credits) | Award (Wager of 4 Credits) | Award (Wager of 5 Credits) |
|---|---|---|---|---|---|---|
| Royal Flush | A♣ K♣ Q♣ J♣ 10♣ | 250 | 500 | 750 | 1000 | 4000 |
| Straight Flush | 10♣ 9♣ 8♣ 7♣ 6♣ | 50 | 100 | 150 | 200 | 250 |
| Four of a Kind | J♣ J♥ J♦ J♣ 3♣ | 25 | 50 | 75 | 100 | 125 |
| Full House | A♥ A♦ A♣ 6♦ 6♣ | 9 | 18 | 27 | 36 | 45 |
| Flush | A♣ J♣ 8♣ 6♣ 2♣ | 6 | 12 | 18 | 24 | 30 |
| Straight | 8♦ 7♣ 6♣ 5♣ 4♣ | 4 | 8 | 12 | 16 | 20 |
| Three of a Kind | Q♣ Q♥ Q♦ 6♦ 2♣ | 3 | 6 | 9 | 12 | 15 |
| Two Pair | 8♦ 8♥ 5♥ 5♣ 2♣ | 2 | 4 | 6 | 8 | 10 |
| Jacks or Better | K♦ K♣ 8♣ 7♣ 2♥ | 1 | 2 | 3 | 4 | 5 | ments, the gaming system provides a multi-hand card game. For a play of the multi-hand card game, following the display of any winning hands, in various embodiments the gaming system enables a player to cause the gaming system to add an enhancement to the display of winning hands within one winning hand category while not adding that enhancement to the display of any other hands. This enables the player to easily distinguish winning hands of different winning hand categories from one another.

More specifically, in one embodiment, the gaming system is configured to operate a card game and initiates a play of the card game. For the play of the card game, the gaming system displays a plurality of initial hands of cards. The gaming system receives at least one hand formation input from a player. The gaming system forms and displays a complete hand of cards for each of the initial hands. For each of the complete hands, the gaming system determines whether that complete hand forms a winning hand associated with one of a plurality of different winning hand categories. The gaming system determines whether at least one of the complete hands forms a winning hand associated with one of the different winning hand categories.

If at least one of the complete hands forms a winning hand associated with one of the different winning hand categories, for each of the complete hands that forms one of the winning hands, the gaming system displays the winning hand category associated with that winning hand. The gaming system receives a selection of one of the displayed winning hand categories. The gaming system: (a) adds an enhancement to the display of any complete hand that forms a winning hand associated with the selected winning hand category without adding that enhancement to the display of any complete hand that does not form a winning hand associated with the selected winning hand category, (b) deemphasizes the display of any complete hand that does not form a winning hand associated with the selected winning hand category without deemphasizing the display of any complete hand that forms a winning hand associated with the selected winning hand category, or (c) both (a) and (b).

Thus, in various embodiments, the gaming system of the present disclosure is configured to provide new, exciting, and engaging variations of card games that facilitate game play and increase player enjoyment and entertainment.

Additional features and advantages are described herein, and will be apparent from, the following Detailed Description and the Figures.

BRIEF DESCRIPTION OF THE FIGURES

FIG. 2 is a flowchart illustrating a method of operating an example embodiment of the gaming system of the present disclosure including an enhanced winning hand display feature.

FIGS. 3A, 3B, 3C, 3D, 3E, 3F, 3G, 3H, and 3I illustrate screen shots of an example gaming system of the present disclosure operating a multi-hand Jacks or Better Five Card Draw Poker game and including a winning hand brightening enhanced winning hand display feature.

FIG. 4 illustrates a screen shot of another example gaming system of the present disclosure including a winning hand enlargement enhanced winning hand display feature.

FIG. 5A is a schematic block diagram of one embodiment of a network configuration of the gaming system of the present disclosure.

DETAILED DESCRIPTION

Enhanced Winning Hand Display Feature

Figure 1:
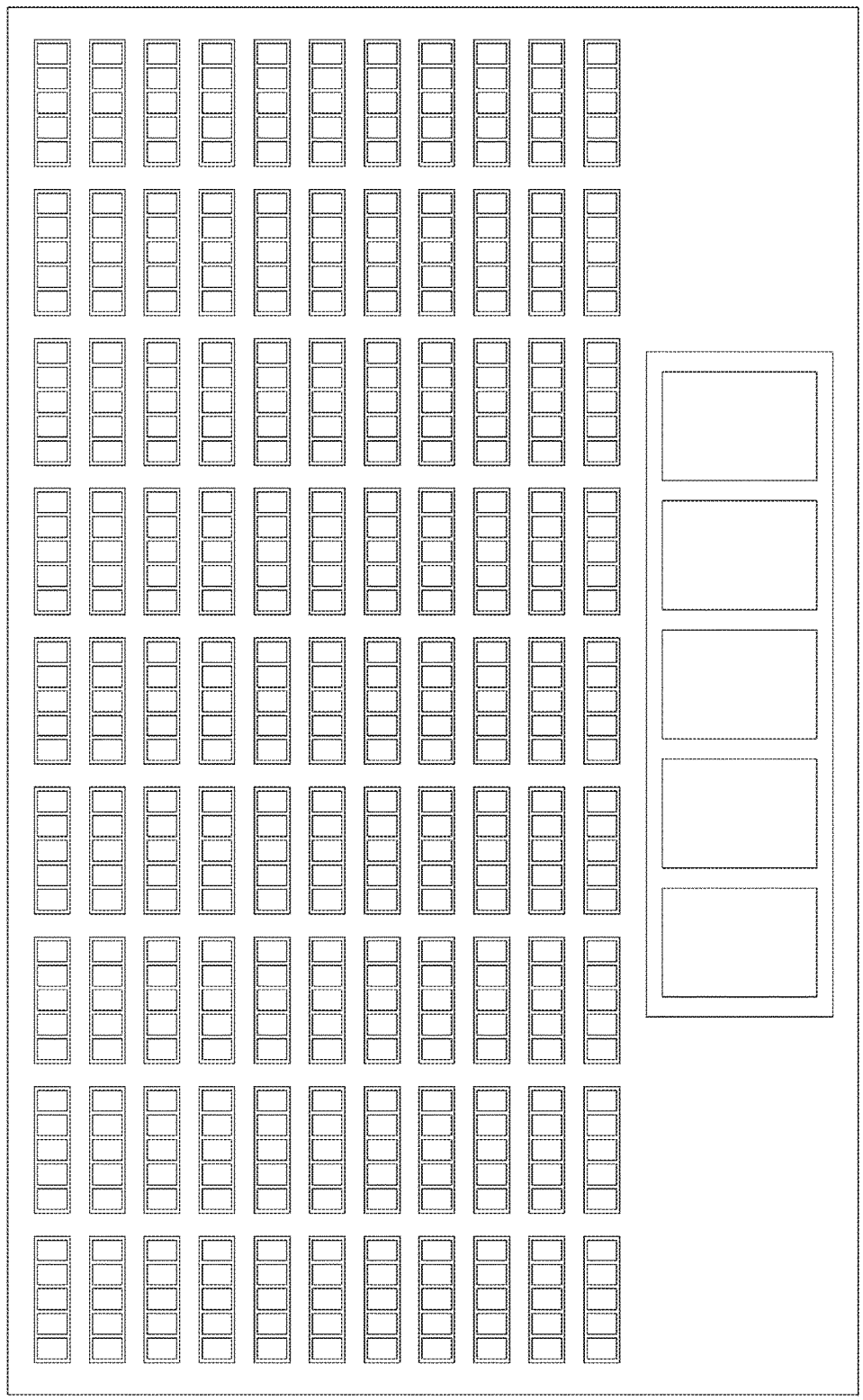
FIG. 1 illustrates a screenshot of a prior art gaming system operating One Hundred Play Video Poker.

Various embodiments of the present disclosure are directed to a gaming system and method providing an enhanced winning hand display feature. While the enhanced winning hand display feature of the present disclosure is described and employed in association with a primary game in the embodiments described below, it should be appreciated that the enhanced winning hand display feature may additionally or alternatively be employed in association with a secondary game or a bonus game. Moreover, while the credit balances, the wagers, and the awards are each displayed as an amount of monetary credits or currency in the embodiments described below, one or more of such credit balances, such wagers, and such awards may be for non-monetary credits, promotional credits, and/or player tracking points or credits.

FIG. 2 illustrates a flowchart of an example process or method 100 of operating the gaming system of the present disclosure. In various embodiments, process 100 is represented by a set of instructions stored in one or more memories and executed by one or more processors. Although process 100 is described with reference to the flowchart shown in FIG. 2, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In this example, the gaming system is configured to operate a card game and initiates a play of the card game for a player, as indicated by block 102. For the play of the card game, the gaming system displays a plurality of initial hands of cards, as indicated by block 104. The gaming system receives at least one hand formation input from the player, as indicated by block 106. The gaming system forms and displays a complete hand of cards for each of the initial hands, as indicated by block 108.

For each of the complete hands, the gaming system determines whether that complete hand forms a winning hand associated with one of a plurality of different winning hand categories, as indicated by block 110. The gaming system determines whether at least one of the complete hands forms a winning hand associated with one of the different winning hand categories, as indicated by diamond 112. If none of the complete hands form any of the winning hands associated with any of the different winning hand categories, the gaming system ends the play of the card game, as indicated by block 114.

If, on the other hand, at least one of the complete hands forms a winning hand associated with one of the different winning hand categories, for each of the complete hands that forms one of the winning hands, the gaming system displays the winning hand category associated with that winning hand, as indicated by block 116. The gaming system receives a selection of one of the displayed winning hand categories, as indicated by block 118. The gaming system adds an enhancement to the display of any complete hand that forms a winning hand associated with the selected winning hand category without adding that enhancement to the display of any complete hand that does not form a winning hand associated with the selected winning hand category, as indicated by block 120.

FIGS. 3A, 3B, 3C, 3D, 3E, 3F, 3G, 3H, and 3I illustrate screen shots of one example embodiment of the gaming system of the present disclosure operating a multi-hand Jacks or Better Five Card Draw Poker game including an example of the enhanced winning hand display feature. In this example, the multi-hand poker game is associated with twenty-five hands. The gaming system displays, such as on a display device 1116 or 1118 (as described below), a primary hand display area 205a and twenty-four additional hand display areas 205b, 205c, 205d, 205e, 205f, 205g, 205h, 205i, 205j, 205k, 205l, 205m, 205n, 205o, 205p, 205q, 205r, 205s, 205t, 205u, 205v, 205w, 205x, and 205y. The gaming system also displays a plurality of displays or meters including: a credit meter 272 that displays a player's credit balance; a wager display 274 that displays any wagers placed on a play of the multi-hand poker game; an award display 276 that displays any awards won for a play of the multi-hand poker game; and a message box 260 that displays messages or indications before, during, or after play of the multi-hand poker game. While in this illustrated example the gaming system indicates the player's credit balance, the player's wager, and any awards provided to the player in the form of amounts of credits, it should be appreciated that such indications may alternatively or additionally be made in the form of amounts of currency.

As illustrated in FIG. 3A, the gaming system receives value, such as currency (or its equivalent), from the player. In this example, the gaming system provides the player 5,250 credits, which represents the received value. The gaming system subsequently receives a wager of 10 credits on each of the twenty-five hands for a total wager of 250 credits for a play of the multi-hand poker game. The gaming system displays the player's total wager of 250 credits in wager display 274. The gaming system displays the player's total remaining credit balance of 5,000 credits (i.e., the player's initial credit balance of 5,250 credits minus the player's wager of 250 credits) in credit meter 272. The gaming system displays the following message in message box 260: "YOU DEPOSITED 5,250 CREDITS AND WAGERED 10 CREDITS ON EACH OF TWENTY-FIVE HANDS. PLEASE WAIT FOR THE CARDS OF YOUR PRIMARY HAND TO BE DEALT."

As illustrated in FIG. 3B, the gaming system determines and displays a primary hand 210a of five cards including A♥ A♦ K♣ 2♦ 4♠. In this example, the gaming system enables the player to choose none of, one of, a plurality of but less than all of, or all of the cards of the primary hand to hold. As described below, the gaming system discards any non-held cards from the primary hand and replaces any discarded cards with replacement cards. The gaming system displays the following message in message box 260: "PLEASE SELECT WHICH CARDS, IF ANY, TO HOLD. EACH OF THE TWENTY-FOUR ADDITIONAL HANDS WILL ALSO INCLUDE ANY HELD CARDS."

As illustrated in FIG. 3C, the gaming system receives a selection of the A♥, A♦, and K♣, and designates those cards as held cards. The gaming system displays a plurality of incomplete additional hands 210b, 210c, 210d, 210e, 210f, 210g, 210h, 210i, 210j, 210k, 210l, 210m, 210n, 210o, 210p, 210q, 210r, 210s, 210t, 210u, 210v, 210w, 210x, and 210y each including the A♥, A♦, and K♣ at additional hand display areas 205b, 205c, 205d, 205e, 205f, 205g, 205h, 205i, 205j, 205k, 205l, 205m, 205n, 205o, 205p, 205q, 205r, 205s, 205t, 205u, 205v, 205w, 205x, and 205y, respectively. The gaming system displays the following message in message box 260: "YOU HELD THE A♥, A♦, and K♣. PLEASE WAIT WHILE TWO CARDS ARE RANDOMLY SELECTED AND ADDED TO EACH OF THE TWENTY-FIVE HANDS."

As illustrated in FIG. 3D, in this example, with respect to primary hand 210a, the gaming system forms a complete primary hand by randomly determining replacement cards A and K and replacing the discarded (i.e., non-held) 2♦ and 4♠ with the A and K. In this example, for each of the incomplete additional hands, the gaming system completes that additional hand by randomly determining two additional cards and adding those two additional cards to that incomplete additional hand to form a complete additional hand. In this example, the gaming system selects the additional cards used to complete the additional hands from separate decks. That is, in this example, each additional hand is associated with a separate deck from which the gaming system selects the additional cards to add to that additional hand. It should be appreciated that in other embodiments the incomplete additional hands may be completed in any suitable manner.

In this example, the gaming system randomly determines additional cards to complete each of the twenty-four additional hands such that: additional hand 210b includes A♥ A♦ K♣ 2♣ 3♦, additional hand 210c includes A♥ ♦ K♣ Q♥ Q♦, additional hand 210d includes A♥ A♦ K♣ 4♦ K♥, additional hand 210e includes A♥ A♦ K♣ 6♣ 8♣, additional hand 210f includes A♥ A♦ K♣ 7♣ 9♠, additional hand 210g includes A♥ A♦ K♣ 10♦ 10♥, additional hand 210h includes A♥ A♦ K♣ K♥ K♠, additional hand 210i includes A♥ A♦ K♣ 7♠ A♣, additional hand 210j includes A♥ A♦ K♣ 6♠ 4♦, additional hand 210k includes A♥ A♦ K♣ 9♠ 10♦, additional hand 210l includes A♥ A♦ K♣ J♦ 8♣, additional hand 210m includes A♥ A♦ K♣ 2♠ 5♦, additional hand 210n includes A♥ A♦ K♣ 2♥ 2♣, additional hand 210o includes A♥ A♦ K♣ A♠ A♣, additional hand 210p includes A♥ A♦ K♣ Q♥ J♣, additional hand 210q includes A♥ A♦ K♣ J♠ 10♦, additional hand 210r includes A♥ A♦ K♣ A♣ 6♦, additional hand 210s includes A♥ A♦ K♣ 8♣ 5♥, additional hand 210t includes A♥ A♦ K♣ 8♣ 8♥, additional hand 210u includes A♥ A♦ K♣ 9♥ 7♠, additional hand 210v includes A♥ A♦ K♣ 4♠ 9♥, additional hand 210w includes A♥ A♦ K♣ J♠ 10♦, additional hand 210x includes A♥ A♦ K♣ 4♠ 10♦, and additional hand 210y includes A♥ A♦ K♣ 4♠ 4♥.

The gaming system determines, for each of the twenty-five complete hands, whether that complete hand forms a winning hand associated with one of a plurality of different winning hand categories. The gaming system also determines an award for each of the complete hands that forms one of the winning hands associated with one of the different winning hand categories. Table 2 below lists the different winning hand categories, an example winning hand for each of the different winning hand categories, and the award associated with each winning hand category for this example multi-hand poker game.

TABLE 2

Winning Hand Categories, Example Winning Hands, and Awards for Example Jacks or Better Five Card Draw Poker

| Winning Hand Category | Example Winning Hand | Award (Wager of 10 Credits Per Hand) |
|---|---|---|
| Royal Flush | A♣ K♣ Q♣ J♣ 10♣ | 2,500 credits |
| Straight Flush | 10♣ 9♣ 8♣ 7♣ 6♣ | 500 credits |
| Four of a Kind | J♣ J♥ J♦ J♠ 3♠ | 250 credits |
| Full House | A♥ A♦ A♣ 6♦ 6♣ | 90 credits |
| Flush | A♣ J♣ 8♣ 6♣ 2♣ | 60 credits |
| Straight | 8♦ 7♣ 6♠ 5♦ 4♣ | 40 credits |
| Three of a Kind | Q♣ Q♥ Q♦ 6♦ 2♠ | 30 credits |
| Two Pair | 8♦ 8♥ 5♥ 5♣ 2♠ | 20 credits |
| Jacks or Better | K♦ K♣ 8♣ 7♣ 2♥ | 10 credits |

In this example, the gaming system determines that: (a) complete hands 210b, 210e, 210f, 210j, 210k, 210l, 210m, 210p, 210q, 210s, 210u, 210v, 210w, and 210x form winning hands associated with the Jacks or Better winning hand category; (b) complete hands 210c, 210d, 210g, 210n, 210t, and 210y form winning hands associated with the Two Pair winning hand category; (c) complete hands 210i and 210r form winning hands associated with the Three of a Kind winning hand category; (d) complete hands 210a and 210h form winning hands associated with the Full House winning hand category; and (e) complete hand 210o forms a winning hand associated with the Four of a Kind winning hand category.

As noted above, for each of the complete hands that forms a winning hand associated with one of the different winning hand categories, the gaming system determines an award for that winning hand. In this example, the gaming system determines: (a) an award of 10 credits for each of complete hands 210b, 210e, 210f, 210j, 210k, 210l, 210m, 210p, 210q, 210s, 210u, 210v, 210w, and 210x, which form winning hands associated with the Jacks or Better winning hand category; (b) an award of 20 credits for each of complete hands 210c, 210d, 210g, 210n, 210t, and 210y, which form winning hands associated with the Two Pair winning hand category; (c) an award of 30 credits for each of complete hands 210i and 210r, which form winning hands associated with the Three of a Kind winning hand category; (d) an award of 90 credits for each of complete hands 210a and 210h, which form winning hands associated with the Full House winning hand category; and (d) an award of 250 credits for complete hand 210o, which forms a winning hand associated with the Four of a Kind winning hand category. The gaming system displays the total 750 credit award in award meter 276, and updates the player's credit balance to reflect the 750 credit award (i.e., updates the player's credit balance from 5,000 credits to 5,750 credits to reflect the 750 credit award).

For each of the complete hands that forms one of the winning hands associated with one of the different winning hand categories, the gaming system displays the award for that winning hand (i.e., the award associated with that winning hand category) in association with that complete hand. Thus, in this example, the gaming system displays: (a) the award of 10 credits associated with the Jacks or Better winning hand category in association with complete hands 210b, 210e, 210f, 210j, 210k, 210l, 210m, 210p, 210q, 210s, 210u, 210v, 210w, and 210x; (b) the award of 20 credits associated with the Two Pair winning hand category in association with complete hands 210c, 210d, 210g, 210n, 210t, and 210y; (c) the award of 30 credits associated with the Three of a Kind winning hand category in association with complete hands 210i and 210r; (d) the award of 90 credits associated with the Full House winning hand category in association with complete hands 210a and 210h; and (e) the award of 250 credits associated with the Four of a Kind winning hand category in association with complete hand 210o.

Additionally, for each of the complete hands that forms a winning hand, the gaming system displays a representation of the winning hand category associated with that winning hand. In this example, the gaming system also displays a quantity of the complete hands that form winning hand associated with that winning hand category in association with the displayed representation of the winning hand category. In this example, the gaming system displays: (a) a representation 220a of the Jacks or Better winning hand category and the number fourteen, which represents the quantity of complete hands that form a winning hand associated with the Jacks or Better winning hand category, in association with displayed representation 220a of the Jacks or Better winning hand category; (b) a representation 220b of the Two Pair winning hand category and the number six, which represents the quantity of complete hands that form a winning hand associated with the Two Pair winning hand category, in association with displayed representation 220b of the Two Pair winning hand category; (c) a representation 220c of the Three of a Kind winning hand category and the number two, which represents the quantity of complete hands that form a winning hand associated with the Three of a Kind winning hand category, in association with displayed representation 220c of the Three of a Kind winning hand category; (d) a representation 220d of the Full House winning hand category and the number two, which represents the quantity of complete hands that form a winning hand associated with the Full House winning hand category, in association with displayed representation 220d of the Full House winning hand category; and (e) a representation 220e of the Four of a Kind winning hand category and the number one, which represents the quantity of complete hands that form a winning hand associated with the Four of a Kind winning hand category, in association with displayed representation 220e of the Four of a Kind winning hand category.

The gaming system enables the player to select one or more of the displayed representations of the different winning hand categories to cause the gaming system to add an enhancement to the display of the complete hands that form winning hands associated with the selected winning hand category. In this example, the gaming system includes a touch screen (as described below) and enables the player to select one or more of the displayed representations of the different winning hand categories by touching those displayed representations of the different winning hand categories. It should be appreciated that the gaming system may enable the player to select one or more of the displayed representations of the different winning hand categories in any other suitable manner, such as via a dedicated physical button or a secondary touch screen.

In this example, the gaming system: (a) adds an enhancement to the display of any complete hand that forms a winning hand associated with the selected winning hand category without adding that enhancement to the display of any complete hand that does not form a winning hand associated with the selected winning hand category, and (b) deemphasizes the display of any complete hand that does not form a winning hand associated with the selected winning hand category without deemphasizing the display of any complete hand that forms a winning hand associated with the selected winning hand category. The gaming system displays the following message in message box 260: "CONGRATULATIONS, YOU WIN 750 CREDITS! TOUCH ONE OF THE WINING HAND CATEGORIES TO HIGHLIGHT YOUR WINNING HANDS IN THAT CATEGORY".

As illustrated in FIG. 3E, at this point in time, the gaming system receives a selection of displayed representation 220a of the Jacks or Better winning hand category. Accordingly, the gaming system: (a) adds an enhancement to the display of the complete hands that form winning hands associated with the Jacks or Better winning hand category without adding that enhancement to the display of any of the other complete hands, and (b) deemphasizes the display of any complete hand that does not form a winning hand associated with the Jacks or Better winning hand category without deemphasizing the display of any complete hand that forms a winning hand associated with the Jacks or Better winning hand category. In this example, the gaming system adds an enhancement by brightening the display of the complete hands that form winning hands associated with the Jacks or Better winning hand category, and deemphasizes the other complete hands by dimming the display of all of those complete hands. Here, the gaming system brightens the display of complete hands 210b, 210e, 210f, 210j, 210k, 210l, 210m, 210p, 210q, 210s, 210u, 210v, 210w, and 210x, which form winning hands associated with the Jacks or Better winning hand category, and dims the display of the remaining complete hands (i.e., all of the complete hands that do not form winning hands associated with the Jacks or Better winning hand category). The gaming system displays the following message in message box 260: "YOUR JACKS OR BETTER WINNING HANDS ARE HIGHLIGHTED."

As illustrated in FIG. 3F, at this point in time, the gaming system receives a selection of displayed representation 220b of the Two Pair winning hand category. Accordingly, the gaming system: (a) adds an enhancement to the display of the complete hands that form winning hands associated with the Two Pair winning hand category without adding that enhancement to the display of any of the other complete hands, and (b) deemphasizes the display of any complete hand that does not form a winning hand associated with the Two Pair winning hand category without deemphasizing the display of any complete hand that forms a winning hand associated with the Two Pair winning hand category. Here, the gaming system brightens the display of complete hands 210c, 210d, 210g, 210n, 210t, and 210y, which form winning hands associated with the Two Pair winning hand category, and dims the display of the remaining complete hands (i.e., all of the complete hands that do not form winning hands associated with the Two Pair winning hand category). The gaming system displays the following message in message box 260: "YOUR TWO PAIR WINNING HANDS ARE HIGHLIGHTED."

Figure 3G:
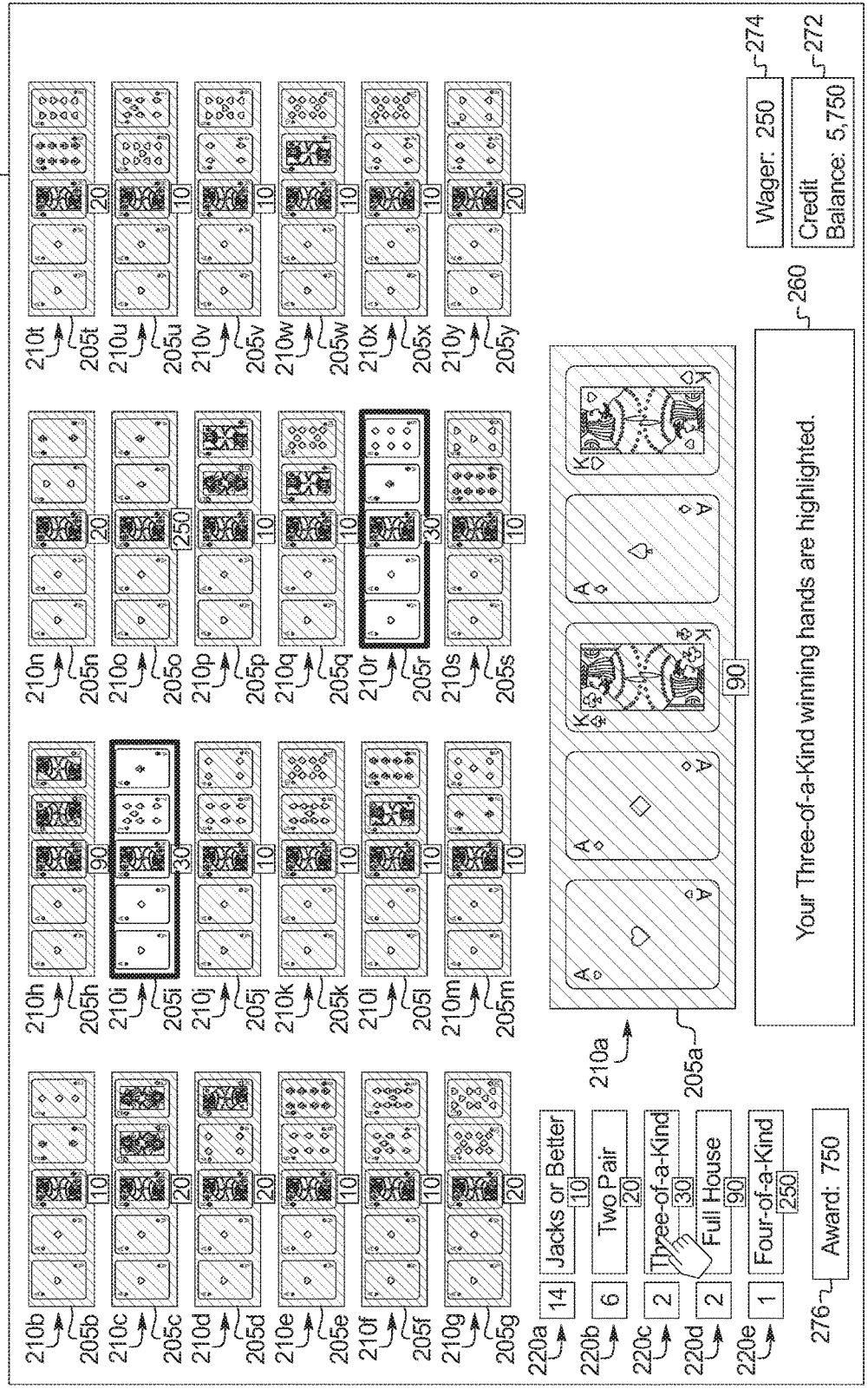

As illustrated in FIG. 3G, at this point in time, the gaming system receives a selection of displayed representation 220c of the Three of a Kind winning hand category. Accordingly, the gaming system: (a) adds an enhancement to the display of the complete hands that form winning hands associated with the Three of a Kind winning hand category without adding that enhancement to the display of any of the other complete hands, and (b) deemphasizes the display of any complete hand that does not form a winning hand associated with the Three of a Kind winning hand category without deemphasizing the display of any complete hand that forms a winning hand associated with the Three of a Kind winning hand category. Here, the gaming system brightens the display of complete hands 210i and 210r, which form winning hands associated with the Three of a Kind winning hand category, and dims the display of the remaining complete hands (i.e., all of the complete hands that do not form winning hands associated with the Three of a Kind winning hand category). The gaming system displays the following message in message box 260: "YOUR THREE OF A KIND WINNING HANDS ARE HIGHLIGHTED."

As illustrated in FIG. 3H, at this point in time, the gaming system receives a selection of displayed representation 220d of the Full House winning hand category. Accordingly, the gaming system: (a) adds an enhancement to the display of the complete hands that form winning hands associated with the Full House winning hand category without adding that enhancement to the display of any of the other complete hands, and (b) deemphasizes the display of any complete hand that does not form a winning hand associated with the Full House winning hand category without deemphasizing the display of any complete hand that forms a winning hand associated with the Full House winning hand category. Here, the gaming system brightens the display of complete hands 210a and 210h, which form winning hands associated with the Full House winning hand category, and dims the display of the remaining complete hands (i.e., all of the complete hands that do not form winning hands associated with the Full House winning hand category). The gaming system displays the following message in message box 260: "YOUR FULL HOUSE WINNING HANDS ARE HIGHLIGHTED."

Figure 3I:
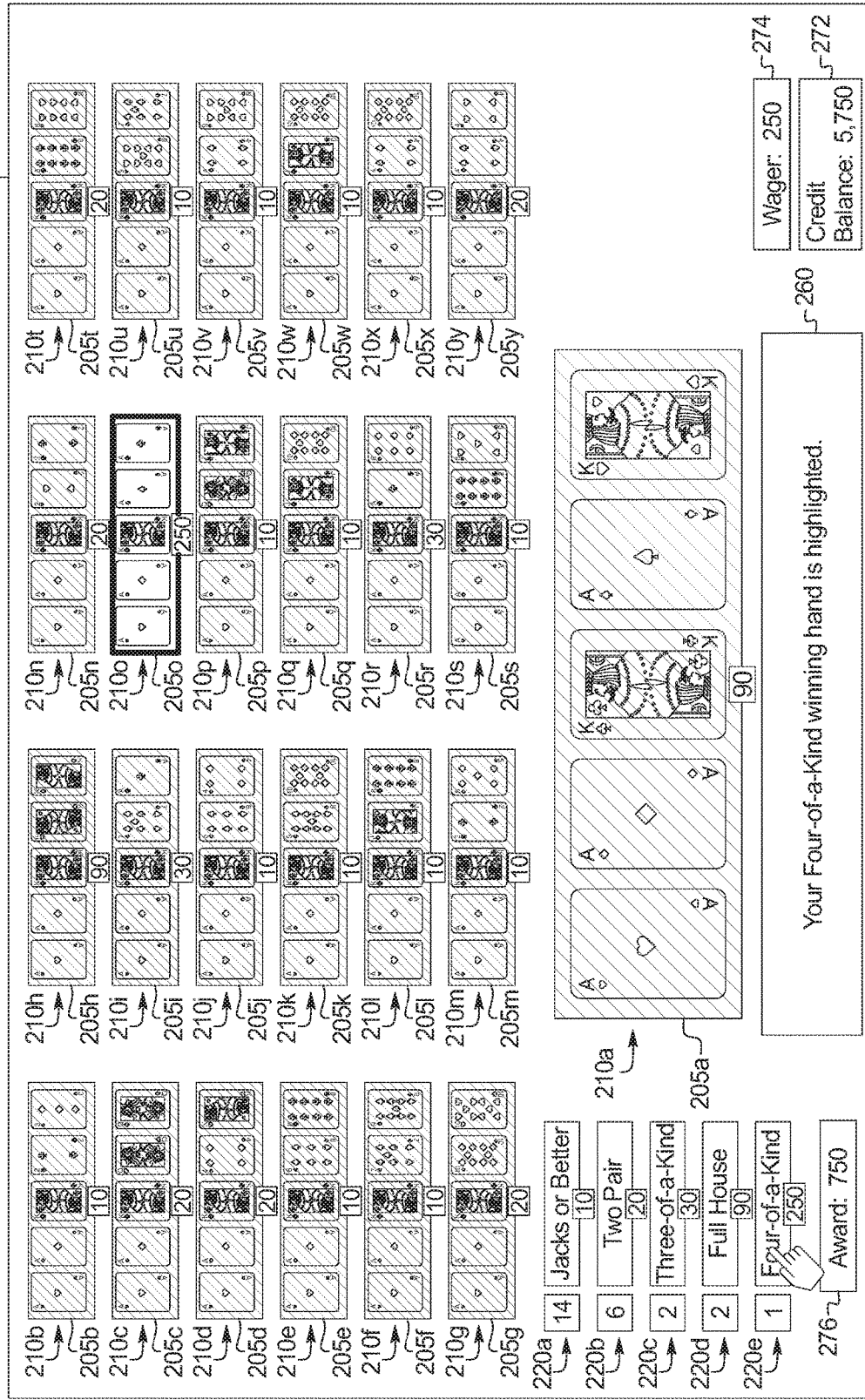
Figure 5B:
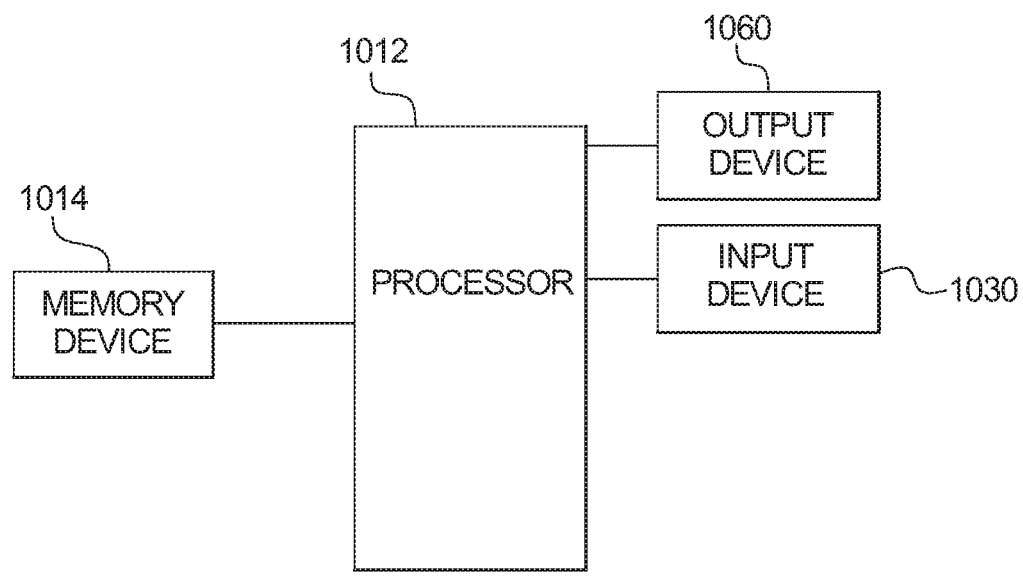
FIG. 5B is a schematic block diagram of an example electronic configuration of the gaming system of the present disclosure.

As illustrated in FIG. 3I, at this point in time, the gaming system receives a selection of displayed representation 220e of the Four of a Kind winning hand category. Accordingly, the gaming system: (a) adds an enhancement to the display of the complete hands that form winning hands associated with the Four of a Kind winning hand category without adding that enhancement to the display of any of the other complete hands, and (b) deemphasizes the display of any complete hand that does not form a winning hand associated with the Four of a Kind winning hand category without deemphasizing the display of any complete hand that forms a winning hand associated with the Four of a Kind winning hand category. Here, the gaming system brightens the display of complete hand 210o, which forms a winning hands associated with the Four of a Kind winning hand category, and dims the display of the remaining complete hands (i.e., all of the complete hands that do not form winning hands associated with the Four of a Kind winning hand category). The gaming system displays the following message in message box 260: "YOUR FOUR OF A KIND WINNING HAND IS HIGHLIGHTED."

It should be appreciated that, in various embodiments, the gaming system is configured to: (a) add an enhancement to the display of the complete hands that form winning hands associated with the selected winning hand category without adding that enhancement to the display of any of the other complete hands, (b) deemphasize the display of any complete hand that does not form a winning hand associated with the selected winning hand category without deemphasizing the display of any of the complete hands that form winning hands associated with the selected winning hand category, or (c) both (a) and (b). It should also be appreciated that the gaming system may do so in any suitable manner or manners, such as any of those described below, or any suitable combinations thereof.

In one embodiment, the gaming system deemphasizes the display of any complete hand that does not form a winning hand associated with the selected winning hand category without deemphasizing the display of any of the other complete hands by dimming the display of all of the complete hands that do not form winning hands associated with the selected winning hand category without dimming the display of any of the complete hands that form winning hands associated with the selected winning hand category. That is, in this embodiment, the gaming system does not also add an enhancement to the complete hands that form winning hands associated with the selected winning hand category (though the gaming system does so in other embodiments).

In another embodiment, the gaming system adds an enhancement to the display of the complete hands that form winning hands associated with the selected winning hand category without adding that enhancement to the display of any of the other complete hands by increasing the size of the complete hands that form winning hands associated with the selected winning hand category without increasing the size of the other complete hands. FIG. 4 illustrates an example of one such embodiment. In this example, the gaming system increases the size of the display of the winning hand associated with the selected Four of a Kind winning hand category without increasing the size of the other complete hands.

In another embodiment, the gaming system deemphasizes the display of any complete hand that does not form a winning hand associated with the selected winning hand category without deemphasizing the display of any of the other complete hands by decreasing the size of the complete hands that do not form winning hands associated with the selected winning hand category without decreasing the size of the complete hands that form winning hands associated with the selected winning hand category.

In another embodiment, the gaming system adds an enhancement to the display of the complete hands that form winning hands associated with the selected winning hand category without adding that enhancement to the display of any of the other complete hands by displaying the complete hands that form winning hands associated with the selected winning hand category on a secondary or additional display device, such as display device 1118 (described below), without displaying the other complete hands on the secondary or additional display device.

In another embodiment, the gaming system adds an enhancement to the display of the complete hands that form winning hands associated with the selected winning hand category without adding that enhancement to the display of any of the other complete hands by displaying an animation in association with the complete hands that form winning hands associated with the selected winning hand category without displaying that animation in association with the other complete hands. In one example, each winning hand category is associated with a different one of a plurality of different animations.

In another embodiment, the gaming system adds an enhancement to the display of the complete hands that form winning hands associated with the selected winning hand category without adding that enhancement to the display of any of the other complete hands by producing a sound in association with the complete hands that form winning hands associated with the selected winning hand category without producing that sound in association with the other complete hands. In one example, each winning hand category is associated with a different one of a plurality of different sounds.

In various embodiments, instead of or in addition to enabling the player to select one or more of the displayed representations of the winning hand categories, the gaming system includes an "auto-cycle" mode configured to cause the gaming system to automatically sequentially select the winning hand categories. For instance, when the "auto-cycle" mode is initiated, the gaming system selects a first one of the winning hand categories and adds an enhancement to the display of the complete hands that form winning hands associated with the selected winning category, then selects a second one of the winning hand categories and adds an enhancement to the display of the complete hands that form winning hands associated with the selected winning category, and so on until all of the displayed representations of the winning hand categories have been selected.

In one such embodiment, the gaming system automatically initiates the "auto-cycle" mode after a designated time period has expired following the display of the complete hands. In another such embodiment, the gaming system enables the player to set the "auto-cycle" mode to default such that the gaming system automatically initiates the "auto-cycle" mode after the complete hands have been displayed. In another such embodiment, the gaming system enables the player to cause the gaming system to stop the "auto-cycle," such as by making a designated input.

In certain embodiments, instead of (or in addition to) displaying representations of winning hand categories, the gaming system displays representations of different award ranges and enables the player to select one or more of the displayed representations of award ranges to cause the gaming system to add an enhancement to the display of the complete hands that form winning hands associated with an award within the selected award range without adding that enhancement to any of the other displayed hands. Alternatively or additionally, the gaming system deemphasizes the complete hands that form winning hands associated with an award outside of the selected award range without deemphasizing the complete hands that form winning hands associated with an award within the selected award range. For instance, if the selected award range is 100 to 200 credits, the gaming system adds an enhancement to the display of the complete hands that form winning hands associated with awards between 100 and 200 credits without adding the enhancement to any of the other complete hands. In one such embodiments, the gaming system enables the player to customize the award ranges.

In other embodiments, instead of (or in addition to) displaying representations of winning hand categories, the gaming system displays representations of different awards and enables the player to select one or more of the displayed representations of awards to cause the gaming system to add an enhancement to the display of the complete hands that form winning hands associated with the selected award without adding that enhancement to any of the other displayed hands. Alternatively or additionally, the gaming system deemphasizes the complete hands that form winning hands associated with an award different from the selected award without deemphasizing the complete hands that form winning hands associated with the selected award. For instance, if the selected award is 250 credits, the gaming system adds an enhancement to the display of the complete hands that form winning hands associated with awards of 250 credits without adding the enhancement to any of the other complete hands.

While the multi-hand card game in the embodiments described above is Jacks or Better Five Card Draw Poker, it should be appreciated that any suitable card game may be employed, such as (but not limited to): Double Bonus Poker, Double Bonus Deuces Wild Poker, Double Double Aces & Faces Poker, Double Double Bonus Poker, Double Double Bonus Plus Poker, Double Joker Poker, Joke Poker Kings, Joker Poker Aces, Joker Poker Two Pair, Nevada Bonus Poker, One-Eyed Jacks Poker, Royal Aces Bonus Poker, Sevens Wild Poker, Super Aces Bonus Poker, Super Bonus Deuces Wild Poker, Super Double Bonus Poker, Super Double Double Bonus Poker, Tens or Better Poker, Triple Bonus Poker, Triple Bonus Plus Poker, Triple Double Bonus Poker, USA Poker, White Hot Aces Poker, Ace & Deuce Bonus Poker, Aces & Eights Poker, Aces & Faces Poker, Acey Deucey Poker, Blackjack Bonus Poker, Bonus Deluxe Poker, Bonus Deuces Wild Poker, Bonus Poker, Deuces Wild Poker, Deuces & Joker Poker, Double Aces & Faces Poker, or Double Acey Deucey Poker.

Additionally, while the multi-hand card game in the embodiments described above includes twenty-five hands (i.e., one primary hand and twenty-four additional hands), it should be appreciated that the card game may be associated with any suitable quantity of hands, such as fifty hands or one hundred hands (e.g., Fifty Play Video Poker or One Hundred Play Video Poker).

It should be appreciated that the enhancements of the present disclosure may be added in addition to any other enhancements to the displays of the complete hands that form winning hands associated with the selected winning hand category. For instance, the enhancements of the present disclosure are added in addition to any color displayed in association with the complete hands forming winning hands associated with the selected winning hand category. In another example, the enhancements of the present disclosure are displayed in addition to any award amount displayed in association with the complete hands forming winning hands associated with the selected winning hand category.

It should be appreciated that the present disclosure contemplates employing an enhanced winning payline display feature in association with a slot game associated with a plurality of paylines in a manner similar to that described above with respect to the use of the enhanced winning hand display feature in association with a card game. In these embodiments, the gaming system initiates a play of the slot game and displays a plurality of symbols at a plurality of symbol display areas. Each of the paylines is associated with a different plurality of the symbol display areas. The gaming system determines, for each of the paylines, whether the symbols displayed at the symbol display areas associated with that payline form one of a plurality of different winning symbol combinations.

The gaming system enables the player to select one of the displayed paylines along which a winning symbol combination is displayed to add an enhancement to the display of the symbols included in that winning symbol combination without adding that enhancement to the display of any of the other symbols. Alternatively or additionally, the gaming system deemphasizes the symbols that are not included in that winning symbol combination without deemphasizing the symbols included in that winning symbol combination. In one example, when the player selects one of the paylines, the gaming system brightens the display of the symbols that form the winning symbol combination displayed along that payline and dims the display of all of the other symbols. In another example, when the player selects one of the paylines, the gaming system dims the display of all of the symbols that do not form the winning symbol combination displayed along that payline without also brightening the symbols that form that winning symbol combination.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines (EGMs); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 4A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 4B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferro-electric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 4B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 6A:
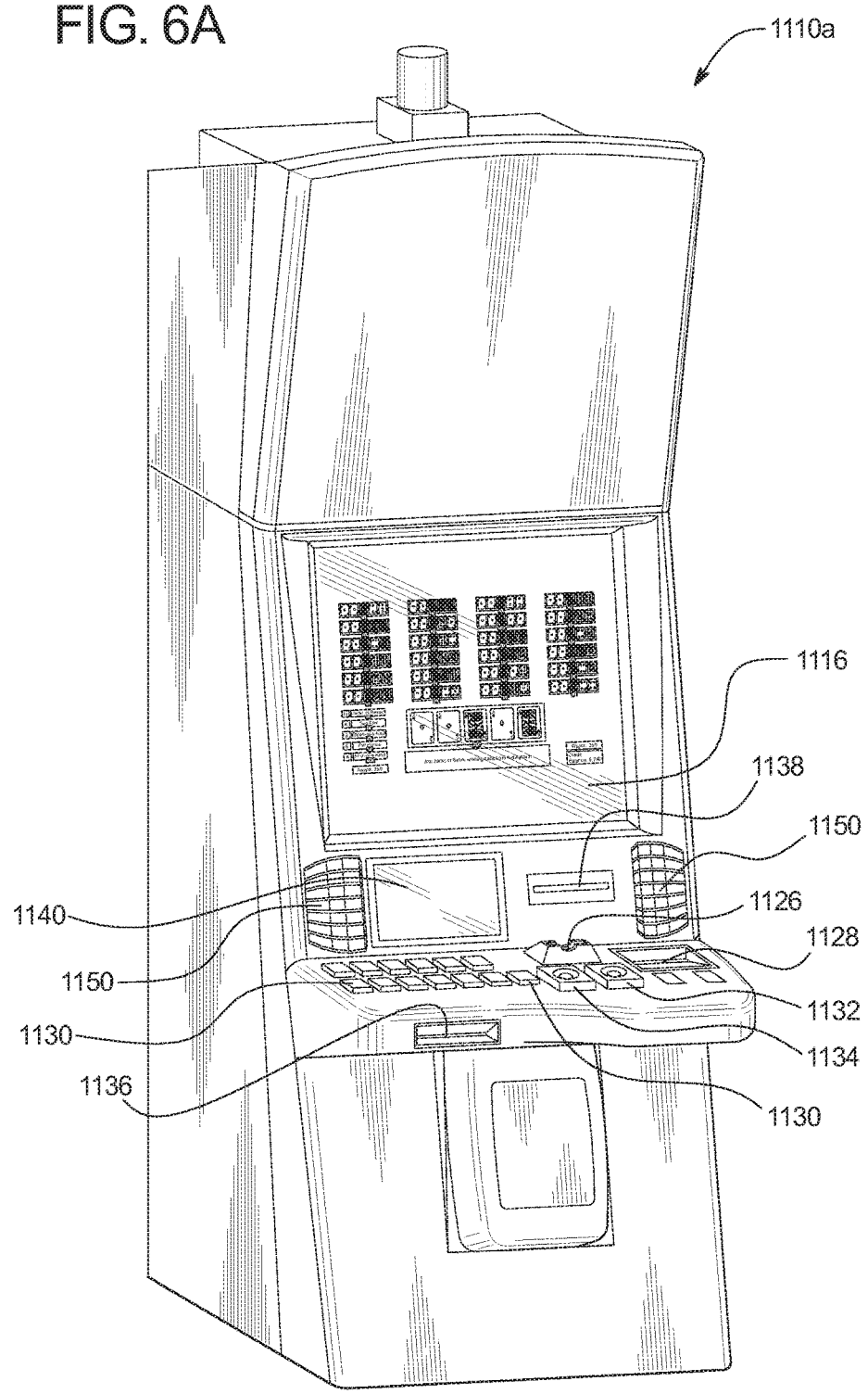
FIGS. 6A and 6B are perspective views of example alternative embodiments of the gaming system of the present disclosure.
Figure 6B:
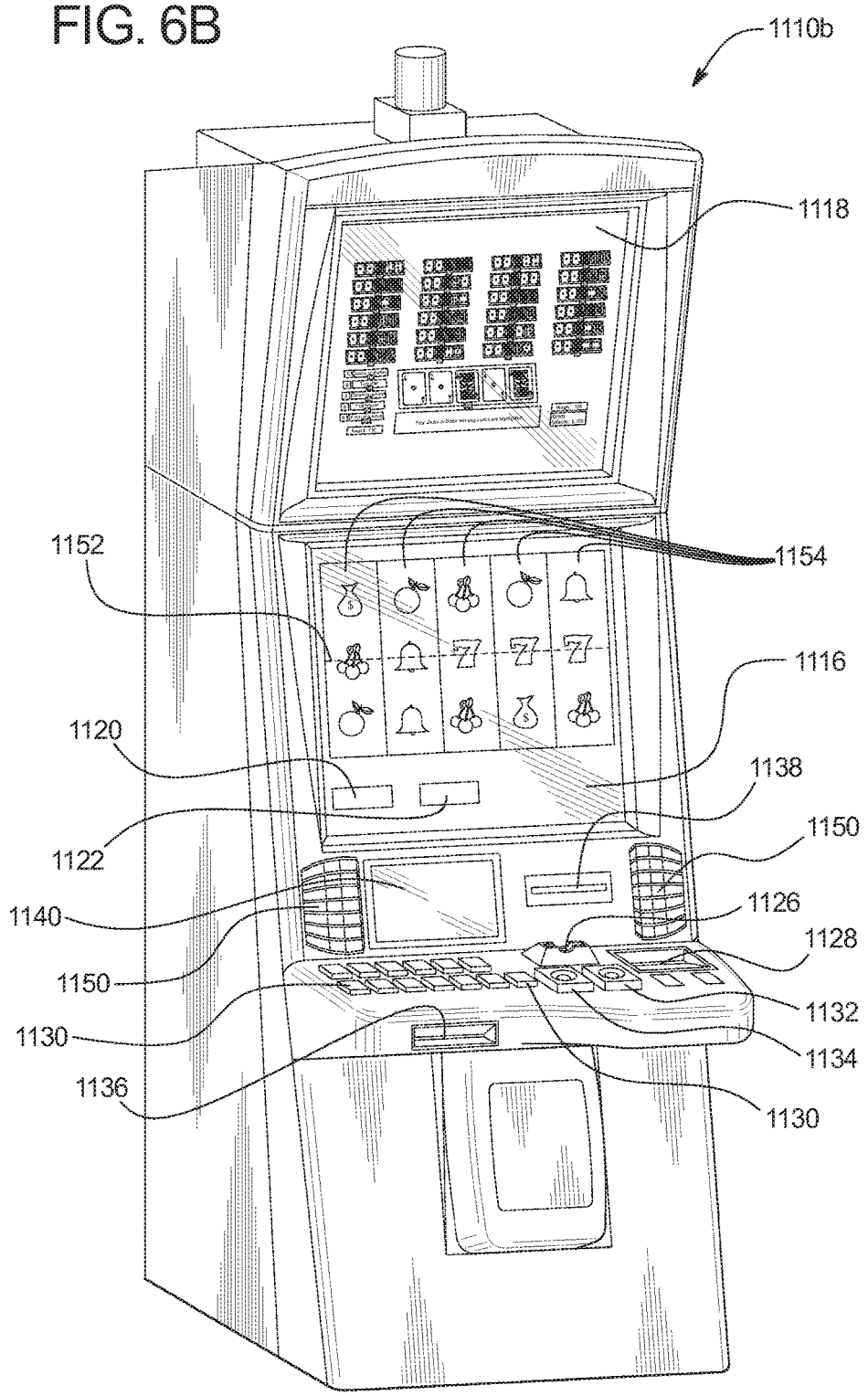

In various embodiments, the EGM includes one or more input devices. The input devices may include any suitable device that enables an input signal to be produced and received by the at least one processor of the EGM. The example EGM illustrated in FIG. 4B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 6A and 6B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 6A and 6B each include a game play activation device in the form of a game play initiation button 1132. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 6A and 6B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 6A and 6B each include a card reader 1138. The card reader is configured to read a player identification card inserted into the card reader.

In various embodiments, the EGM includes one or more output devices. The example EGM illustrated in FIG. 4B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 6A includes a central display device 1116, a player tracking display 1140, a credit display 1120, and a bet display 1122. The example EGM illustrated in FIG. 6B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 6A and 6B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 6A and 6B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No.

2004/0254014 describes a variety of EGMs including one or more communication ports that enable the EGMs to communicate and operate with one or more external peripherals.

As generally described above, in certain embodiments, such as the example EGMs illustrated in FIGS. 6A and 6B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 6A and 6B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both.

In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM shown in FIG. 6B each includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is as follows:

1. A gaming system comprising:
a housing;
at least one processor;
at least one display device supported by the housing;
at least one input device supported by the housing;
an acceptor supported by the housing and configured to receive a physical item associated with a monetary value; and
at least one memory device storing a plurality of instructions which, when executed by the at least one processor, cause the at least one processor to:
establish a credit balance based at least in part on the monetary value associated with the physical item responsive to receipt of the physical item by the acceptor;
enable a placement of a wager on a play of a game via the at least one input device, the credit balance being decreasable by the wager;
for the play of the game;
randomly determine a plurality of initial hands of cards,
cause the at least one display device to display the plurality of initial hands of cards;
responsive to receipt of at least one hand formation input via the at least one input device, for each initial hand;
form a complete hand of cards, and
cause the at least one display device to display the complete hand of cards;
for each complete hand, determine whether that complete hand forms a winning hand associated with one of a plurality of different winning hand categories;
responsive to at least one complete hand forming one of the winning hands:
for each complete hand that forms one of the winning hands, increase the credit balance based on an award associated with that winning hand;
cause the at least one display device to display an indication of each winning hand category associated with at least one complete hand that forms one of the winning hands; and
responsive to receipt of a selection by a player of one of the displayed winning hand categories via the at least one input device, cause the at least one display device to deemphasize the display of any complete hand that does not form the winning hand associated with the one player selected winning hand category without deemphasizing the display of any complete hand that forms the winning hand associated with the one player selected winning hand category; and
initiate a payout associated with the credit balance responsive to receipt of a cashout input.

2. The gaming system of claim 1, wherein the plurality of instructions, when executed by the at least one processor, cause the at least one processor to, for each of the displayed winning hand categories, cause the at least one display device to display in association with that displayed winning hand category a quantity of the complete hands that form the winning hand associated with that displayed winning hand category.

3. The gaming system of claim 1, wherein the plurality of instructions, when executed by the at least one processor responsive to receipt of a second selection, by the player, of a different, second one of the displayed winning hand categories, cause the at least one processor to cause the at least one display device to deemphasize the display of any complete hand that does not form the winning hand associated with the selected second winning hand category without deemphasizing the display of any complete hand that forms the winning hand associated with the one player selected second winning hand category.

4. The gaming system of claim 1, wherein the plurality of instructions, when executed by the at least one processor, cause the at least one processor to cause the at least one display device to deemphasize the display of a complete hand that does not form the winning hand associated with the one player selected winning hand category by dimming the display of that complete hand.

5. The gaming system of claim 1, wherein the plurality of instructions, when executed by the at least one processor, cause the at least one processor to cause the at least one display device to deemphasize the display of a complete hand that does not form the winning hand associated with the one player selected winning hand category by decreasing a size of the cards of that complete hand.

6. The gaming system of claim 1, wherein the plurality of instructions, when executed by the at least one processor, cause the at least one processor to cause the at least one display device to add an enhancement to the display of any complete hand that forms the winning hand associated with the one player selected winning hand category without adding the enhancement to the display of any complete hand that forms a winning hand other than the winning hand associated with the one player selected winning hand category.

7. The gaming system of claim 6, wherein the plurality of instructions, when executed by the at least one processor, cause the at least one processor to cause the at least one display device to add the enhancement to the display of a complete hand that forms the winning hand associated with the one player selected winning hand category by brightening the display of that complete hand.

8. The gaming system of claim 6, wherein the plurality of instructions, when executed by the at least one processor, cause the at least one processor to cause the at least one display device to add the enhancement to the display of a complete hand that forms the winning hand associated with the one player selected winning hand category by increasing a size of the cards of that complete hand.

9. The gaming system of claim 1, wherein the game includes one of: (1) one-hundred complete hands of cards, and (2) fifty complete hands of cards.

10. The gaming system of claim 1, wherein the physical item is one of: (1) a ticket associated with the monetary value; and (2) currency.

11. A method of operating a gaming system, said method comprising:
establishing, by a processor, a credit balance based at least in part on a monetary value associated with a physical item received by an acceptor;

placing, by the processor, a wager on a play of a game responsive to an actuation of a wager button, the credit balance being decreasable by the wager;

for the play of the game;

randomly determining, by the processor, a plurality of initial hands of cards and causing, by the processor, a display device to display the initial hands of cards;

forming, by the processor, a complete hand of cards for each initial hand responsive to at least one hand formation input and causing, by the processor, the display device to display the complete hands of cards;

for each complete hand, determining, by the processor, whether that complete hand forms a winning hand associated with one of a plurality of different winning hand categories;

responsive to at least one complete hand forming one of the winning hands:

for each complete hand that forms one of the winning hands, increasing, by the processor, the credit balance based on an award associated with that winning hand;

causing, by the processor, the display device to display an indication of each winning hand category associated with at least one complete hand that forms one of the winning hands; and responsive to receipt of a selection, by a player, of one of the displayed winning hand categories, causing, by the processor, the display device to deemphasize the display any complete hand that does not form the winning hand associated with the one player selected winning hand category without deemphasizing the display of any complete hand that forms the winning hand associated with the one player selected winning hand category; and initiating, by the processor, a payout associated with the credit balance responsive to a cashout input.

12. The method of claim 11, further comprising, for each of the displayed winning hand categories, causing, by the processor, the display device to display, in association with that displayed winning hand category, a quantity of the complete hands that form the winning hand associated with that displayed winning hand category.

13. The method of claim 11, further comprising, responsive to receipt of a second selection, by the player, of a second, different one of the displayed winning hand categories, causing, by the processor, the display device to deemphasize the display any complete hand that does not form the winning hand associated with the second player selected winning hand category without deemphasizing the display of any complete hand that forms the winning hand associated with the second player selected winning hand category.

14. The method of claim 11, further comprising causing, by the processor, the display device to deemphasize the display of any complete hand that does not form the winning hand associated with the one player selected winning hand category by dimming the display of that complete hand.

15. The method of claim 11, further comprising causing, by the processor, the display device to deemphasize the display of a complete hand that does not form the winning hand associated with the one player selected winning hand category by decreasing a size of the cards of that complete hand.

16. The method of claim 11, further comprising causing, by the processor, the display device to add an enhancement to the display of any complete hand that forms the winning hand associated with the one player selected winning hand category without adding the enhancement to the display of a complete hand that forms a winning hand other than the winning hand associated with the one player selected winning hand category.

17. The method of claim 16, further comprising causing, by the processor, the display device to add the enhancement to the display of a complete hand that forms the winning hand associated with the one player selected winning hand category by brightening the display of that complete hand.

18. The method of claim 16, further comprising causing, by the processor, the display device to add the enhancement to the display of a complete hand that forms the winning hand associated with the one player selected winning hand category by increasing a size of the cards of that complete hand.

19. The method of claim 11, wherein the game includes one of: (1) one-hundred complete hands of cards, and (2) fifty complete hands of cards.

20. The method of claim 11, wherein the physical item is one of: (1) a ticket associated with the monetary value; and (2) currency.

* * * * *